United States Patent
Ng et al.

(10) Patent No.: US 12,355,820 B2
(45) Date of Patent: *Jul. 8, 2025

(54) INFERENTIAL ANALYSIS USING FEEDBACK FOR EXTRACTING AND COMBINING CYBER RISK INFORMATION

(71) Applicant: Guidewire Software, Inc., San Mateo, CA (US)

(72) Inventors: George Y. Ng, San Mateo, CA (US); Brian Wu, San Francisco, CA (US); Ming Yang, San Mateo, CA (US); Paul Yang, San Mateo, CA (US); Fernando Tancioco, Jr., San Ramon, CA (US)

(73) Assignee: Guidewire Software, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,085

(22) Filed: Nov. 17, 2023

(65) Prior Publication Data
US 2024/0244084 A1    Jul. 18, 2024

Related U.S. Application Data

(63) Continuation of application No. 17/477,294, filed on Sep. 16, 2021, now Pat. No. 11,863,590, which is a
(Continued)

(51) Int. Cl.
*H04L 29/06*    (2006.01)
*G06N 20/00*    (2019.01)
(Continued)

(52) U.S. Cl.
CPC ............. *H04L 63/20* (2013.01); *G06N 20/00* (2019.01); *G06Q 30/012* (2013.01); *G06Q 40/06* (2013.01); *G06Q 40/08* (2013.01); *H04L 63/1433* (2013.01)

(58) Field of Classification Search
CPC ..... H04L 63/1433; H04L 63/20; H04L 69/40; G06Q 40/06; G06Q 40/08
See application file for complete search history.

(56) References Cited

U.S. PATENT DOCUMENTS 5,243,428 A    9/1993   Challapali
5,535,383 A    7/1996   Gower
(Continued)

FOREIGN PATENT DOCUMENTS

EP    3675455       7/2020
JP    2006295910    10/2006
(Continued)

OTHER PUBLICATIONS

Bohme et al., "Models and Measures for Correlation in Cyber-Insurance," Workshop on the Economics of Information Security (WEIS), Jun. 2006, Retrieved from <http://www.econinfosec.org/archive/weis2006/docs/16.pdf>.
(Continued)

*Primary Examiner* — Mahfuzur Rahman
(74) *Attorney, Agent, or Firm* — Van Pelt, Yi & James LLP

(57) ABSTRACT

Inferential analysis includes: assessing risk of a cyber security failure in a computer network of an entity, using a computer agent configured to collect information from at least one accessible Internet elements, automatically determining, based on the assessed risk, a change or a setting to at least one element of policy criteria of a cyber security policy; and automatically recommending, based on the assessed risk, a computer network change to reduce the assessed risk.

20 Claims, 19 Drawing Sheets

Related U.S. Application Data continuation of application No. 16/662,936, filed on Oct. 24, 2019, now Pat. No. 11,153,349, which is a continuation of application No. 15/971,946, filed on May 4, 2018, now Pat. No. 10,511,635, which is a continuation of application No. 15/371,047, filed on Dec. 6, 2016, now Pat. No. 10,230,764, which is a continuation-in-part of application No. 15/141,779, filed on Apr. 28, 2016, now Pat. No. 9,521,160, which is a continuation-in-part of application No. PCT/US2015/067968, filed on Dec. 29, 2015, and a continuation-in-part of application No. 14/931,510, filed on Nov. 3, 2015, now Pat. No. 9,373,144, said application No. PCT/US2015/067968 is a continuation of application No. 14/614,897, filed on Feb. 5, 2015, now abandoned, said application No. 14/931,510 is a continuation-in-part of application No. 14/585,051, filed on Dec. 29, 2014, now Pat. No. 9,253,203.

(60) Provisional application No. 62/098,238, filed on Dec. 30, 2014.

(51) Int. Cl.
  G06Q 30/012  (2023.01)
  G06Q 40/06  (2012.01)
  G06Q 40/08  (2012.01)
  H04L 9/40  (2022.01)

(56) References Cited

U.S. PATENT DOCUMENTS

| | | | |
|---|---|---|---|
| 5,754,973 A | 5/1998 | Akune | |
| 5,920,861 A | 7/1999 | Hall | |
| 5,949,876 A | 9/1999 | Ginter | |
| 5,987,440 A | 11/1999 | O'Neil | |
| 6,269,349 B1 | 7/2001 | Aieta | |
| 6,374,358 B1 | 4/2002 | Townsend | |
| 6,839,689 B2 | 1/2005 | Aieta | |
| 6,980,927 B2 | 12/2005 | Tracy | |
| 7,047,419 B2 | 5/2006 | Black | |
| 7,324,952 B2 | 1/2008 | Hisano | |
| 7,680,659 B2 | 3/2010 | Gao | |
| 7,711,646 B2 | 5/2010 | Cianciarulo | |
| 8,332,242 B1 | 12/2012 | Medina, III | |
| 8,448,245 B2 | 5/2013 | Banerjee | |
| 8,468,599 B2 | 6/2013 | McCusker | |
| 8,484,066 B2 | 7/2013 | Miller | |
| 8,494,955 B2 | 7/2013 | Quarterman | |
| 8,577,775 B1 | 11/2013 | Gerber | |
| 8,601,587 B1 | 12/2013 | Powell | |
| 8,699,767 B1 | 4/2014 | Khosla | |
| 8,744,894 B2 | 6/2014 | Christiansen | |
| 8,973,088 B1 | 3/2015 | Leung | |
| 9,027,125 B2 | 5/2015 | Kumar | |
| 9,031,951 B1 | 5/2015 | Baluja | |
| 9,043,905 B1 | 5/2015 | Allen | |
| 9,100,430 B1 | 8/2015 | Seiver | |
| 9,241,008 B2 | 1/2016 | Powell | |
| 9,253,203 B1 | 2/2016 | Ng | |
| 9,292,881 B2 | 3/2016 | Alperovitch | |
| 9,367,694 B2 | 6/2016 | Eck | |
| 9,373,144 B1 | 6/2016 | Ng | |
| 9,471,777 B1 | 10/2016 | Juels | |
| 9,521,160 B2 | 12/2016 | Ng | |
| 9,613,442 B2 | 4/2017 | Pan | |
| 9,646,428 B1 | 5/2017 | Konrardy | |
| 9,699,209 B2 | 7/2017 | Ng | |
| 9,715,711 B1 | 7/2017 | Konrardy | |
| 9,893,970 B2 | 2/2018 | Gauvin | |
| 9,894,036 B2 | 2/2018 | Weinberger | |
| 10,050,989 B2 | 8/2018 | Ng | |
| 10,050,990 B2 | 8/2018 | Ng | |
| 10,099,297 B2 | 10/2018 | Lemmer | |
| 10,102,589 B1 | 10/2018 | Tofte | |
| 10,230,764 B2* | 3/2019 | Ng | G06Q 30/012 |
| 10,326,786 B2* | 6/2019 | Gladstone | G06Q 50/01 |
| 10,404,737 B1 | 9/2019 | Sweeney | |
| 10,404,748 B2 | 9/2019 | Parthasarathi | |
| 10,498,757 B2 | 12/2019 | Pickles | |
| 10,574,539 B2 | 2/2020 | Brown | |
| 10,656,993 B2 | 5/2020 | Thatcher | |
| 2002/0026335 A1 | 2/2002 | Honda | |
| 2002/0091551 A1 | 7/2002 | Parisi | |
| 2003/0014342 A1 | 1/2003 | Vande Pol | |
| 2003/0014344 A1 | 1/2003 | Chacko | |
| 2003/0028803 A1 | 2/2003 | Bunker | |
| 2003/0040942 A1 | 2/2003 | Hooten | |
| 2003/0084349 A1 | 5/2003 | Friedrichs | |
| 2003/0126049 A1 | 7/2003 | Nagan | |
| 2003/0135758 A1 | 7/2003 | Turner | |
| 2003/0154393 A1 | 8/2003 | Young | |
| 2003/0236990 A1 | 12/2003 | Hrastar | |
| 2004/0006532 A1 | 1/2004 | Lawrence | |
| 2004/0010709 A1 | 1/2004 | Baudoin | |
| 2004/0024693 A1 | 2/2004 | Lawrence | |
| 2004/0049698 A1 | 3/2004 | Ott | |
| 2004/0064726 A1 | 4/2004 | Girouard | |
| 2004/0167793 A1 | 8/2004 | Masuoka | |
| 2004/0260945 A1 | 12/2004 | Raikar | |
| 2005/0015624 A1 | 1/2005 | Ginter | |
| 2005/0044418 A1 | 2/2005 | Miliefsky | |
| 2005/0096944 A1 | 5/2005 | Ryan | |
| 2005/0097320 A1 | 5/2005 | Golan | |
| 2005/0131828 A1 | 6/2005 | Gearhart | |
| 2005/0132225 A1 | 6/2005 | Gearhart | |
| 2005/0261943 A1 | 11/2005 | Quarterman | |
| 2005/0278786 A1 | 12/2005 | Tippett | |
| 2006/0020814 A1 | 1/2006 | Lieblich | |
| 2006/0062443 A1 | 3/2006 | Basu | |
| 2006/0184473 A1 | 8/2006 | Eder | |
| 2006/0265746 A1 | 11/2006 | Farley | |
| 2007/0005680 A1 | 1/2007 | Jrad | |
| 2007/0180490 A1 | 8/2007 | Renzi | |
| 2007/0192867 A1 | 8/2007 | Miliefsky | |
| 2007/0294118 A1 | 12/2007 | Tait | |
| 2007/0298720 A1 | 12/2007 | Wolman | |
| 2008/0016563 A1 | 1/2008 | McConnell | |
| 2008/0047016 A1 | 2/2008 | Spoonamore | |
| 2008/0162377 A1 | 7/2008 | Pinkas | |
| 2008/0167920 A1 | 7/2008 | Schmidt | |
| 2008/0250064 A1 | 10/2008 | Duchon | |
| 2008/0280637 A1* | 11/2008 | Shaffer | H04L 41/0894 455/519 |
| 2009/0024663 A1 | 1/2009 | McGovern | |
| 2009/0037323 A1 | 2/2009 | Feinstein | |
| 2009/0063365 A1 | 3/2009 | Pinkas | |
| 2009/0126018 A1 | 5/2009 | Keohane | |
| 2009/0271863 A1 | 10/2009 | Govindavajhala | |
| 2009/0319342 A1 | 12/2009 | Shilman | |
| 2010/0046553 A1 | 2/2010 | Daigle | |
| 2010/0114634 A1 | 5/2010 | Christiansen | |
| 2010/0153156 A1* | 6/2010 | Guinta | G06Q 10/0635 706/54 |
| 2010/0205014 A1 | 8/2010 | Sholer | |
| 2010/0229187 A1 | 9/2010 | Marwah | |
| 2011/0036909 A1 | 2/2011 | Berkun | |
| 2011/0078073 A1 | 3/2011 | Annappindi | |
| 2011/0154497 A1 | 6/2011 | Bailey, Jr. | |
| 2011/0161116 A1 | 6/2011 | Peak | |
| 2011/0239267 A1 | 9/2011 | Lyne | |
| 2011/0244798 A1 | 10/2011 | Daigle | |
| 2011/0277034 A1 | 11/2011 | Hanson | |
| 2011/0289597 A1 | 11/2011 | Hinds | |
| 2011/0295722 A1 | 12/2011 | Reisman | |
| 2011/0313930 A1 | 12/2011 | Bailey, Jr. | |
| 2012/0011077 A1 | 1/2012 | Bhagat | |
| 2012/0041790 A1 | 2/2012 | Koziol | |
| 2012/0046989 A1 | 2/2012 | Baikalov | |
| 2012/0059779 A1 | 3/2012 | Syed | |
| 2012/0079598 A1 | 3/2012 | Brock | |
| 2012/0089617 A1 | 4/2012 | Frey | |

(56) References Cited

U.S. PATENT DOCUMENTS

| | | |
|---|---|---|
| 2012/0096558 A1 | 4/2012 | Evrard |
| 2012/0159624 A1 | 6/2012 | König |
| 2012/0215575 A1 | 8/2012 | Deb |
| 2012/0239438 A1 | 9/2012 | Hemmings |
| 2012/0284158 A1 | 11/2012 | Kovac |
| 2012/0300975 A1 | 11/2012 | Chalamala |
| 2013/0055404 A1 | 2/2013 | Khalili |
| 2013/0073473 A1 | 3/2013 | Heath |
| 2013/0104236 A1 | 4/2013 | Ray |
| 2013/0188475 A1 | 7/2013 | Lim |
| 2013/0191829 A1 | 7/2013 | Shimokawa |
| 2013/0218670 A1 | 8/2013 | Spears |
| 2013/0239167 A1 | 9/2013 | Sreenivas |
| 2013/0239168 A1 | 9/2013 | Sreenivas |
| 2013/0239177 A1 | 9/2013 | Sigurdson |
| 2013/0283336 A1 | 10/2013 | Macy |
| 2013/0346328 A1 | 12/2013 | Agle |
| 2013/0347060 A1 | 12/2013 | Hazzani |
| 2014/0007190 A1 | 1/2014 | Alperovitch |
| 2014/0019171 A1 | 1/2014 | Koziol |
| 2014/0067713 A1 | 3/2014 | Gerber |
| 2014/0067716 A1 | 3/2014 | Gerber |
| 2014/0122163 A1 | 5/2014 | Simpson |
| 2014/0137257 A1 | 5/2014 | Martinez |
| 2014/0142988 A1 | 5/2014 | Grosso |
| 2014/0181982 A1* | 6/2014 | Guo .................. G06F 21/60 |
| | | 726/25 |
| 2014/0200930 A1 | 7/2014 | Zizzamia |
| 2014/0215621 A1 | 7/2014 | Xaypanya |
| 2014/0257917 A1 | 9/2014 | Spencer |
| 2014/0257918 A1 | 9/2014 | Spencer |
| 2014/0328179 A1 | 11/2014 | Kabakura |
| 2014/0379708 A1 | 12/2014 | Fox |
| 2015/0088595 A1 | 3/2015 | Chillar |
| 2015/0095206 A1 | 4/2015 | Van Heerden |
| 2015/0100442 A1 | 4/2015 | Van Heerden |
| 2015/0100443 A1 | 4/2015 | Van Heerden |
| 2015/0106260 A1 | 4/2015 | Andrews |
| 2015/0188949 A1 | 7/2015 | Mahaffey et al. |
| 2015/0269383 A1 | 9/2015 | Lang |
| 2015/0271142 A1 | 9/2015 | Oliphant |
| 2015/0324559 A1 | 11/2015 | Boss |
| 2015/0331932 A1 | 11/2015 | Georges |
| 2015/0341389 A1 | 11/2015 | Kurakami |
| 2015/0373043 A1 | 12/2015 | Wang |
| 2015/0379488 A1 | 12/2015 | Ruff |
| 2015/0381662 A1 | 12/2015 | Nair |
| 2016/0099963 A1* | 4/2016 | Mahaffey .............. H04L 63/166 |
| | | 726/25 |
| 2016/0148332 A1 | 5/2016 | Stibel |
| 2016/0155066 A1 | 6/2016 | Drame |
| 2016/0162924 A1 | 6/2016 | Rathod |
| 2016/0189301 A1 | 6/2016 | Ng |
| 2016/0197953 A1 | 7/2016 | King-Wilson |
| 2016/0205138 A1 | 7/2016 | Krishnaprasad |
| 2016/0212169 A1 | 7/2016 | Knjazihhin |
| 2016/0234247 A1 | 8/2016 | Ng |
| 2016/0248799 A1 | 8/2016 | Ng |
| 2016/0248800 A1 | 8/2016 | Ng |
| 2016/0294854 A1 | 10/2016 | Parthasarathi |
| 2016/0306979 A1 | 10/2016 | Kotler |
| 2017/0085595 A1 | 3/2017 | Ng |
| 2017/0093904 A1 | 3/2017 | Ng |
| 2017/0093905 A1 | 3/2017 | Ng |
| 2017/0116552 A1 | 4/2017 | Deodhar |
| 2017/0142140 A1 | 5/2017 | Muddu |
| 2017/0187745 A1 | 6/2017 | Ng |
| 2018/0025157 A1 | 1/2018 | Titonis |
| 2018/0359276 A1 | 12/2018 | Ng |
| 2019/0035027 A1 | 1/2019 | Ng |
| 2021/0358046 A1* | 11/2021 | Roll .................. G06Q 40/08 |
| 2022/0245727 A1* | 8/2022 | Roll .................. H04L 9/3297 |

FOREIGN PATENT DOCUMENTS

| | | |
|---|---|---|
| TW | 201636937 | 10/2016 |
| WO | 2014036396 | 3/2014 |
| WO | 2016109162 | 7/2016 |
| WO | 2016109608 | 7/2016 |
| WO | 2017078986 | 5/2017 |

OTHER PUBLICATIONS

International Search Report & Written Opinion dated Feb. 10, 2016 in Patent Cooperation Treaty Application No. PCT/US2015/065365, filed Dec. 11, 2015.

International Search Report & Written Opinion dated Feb. 26, 2016 in Patent Cooperation Treaty Application No. PCT/US2015/067968, filed Dec. 29, 2015.

International Search Report and Written Opinion of the International Searching Authority, Patent Cooperation Treaty Application No. PCT/US2016/058711, Dec. 8, 2016, 9 pages.

Martin Salois, "Password Complexity Recommendations", Defense Research and Development Canada, Oct. 2014, pp. 1-34.

Mathew et al., "Intruders and Password Management," International Journal of Science Technology & Engineering, Oct. 2015, pp. 312-315.

Notice of Allowance mailed Aug. 24, 2017 for U.S. Appl. No. 15/099,297, filed Apr. 14, 2016.

Notice of Allowance mailed Jan. 3, 2017 for U.S. Appl. No. 15/142,997, filed Apr. 29, 2016.

Notice of Allowance mailed Jul. 29, 2016 in U.S. Appl. No. 15/141,779, filed Apr. 28, 2016.

Notice of Allowance mailed Mar. 15, 2016 for U.S. Appl. No. 14/931,510, filed Nov. 3, 2015.

Notice of Allowance mailed Sep. 25, 2015 for U.S. Appl. No. 14/585,051, filed Dec. 29, 2014.

Office Action mailed Apr. 1, 2015 for U.S. Appl. No. 14/585,051, filed Dec. 29, 2014.

Office Action mailed Apr. 20, 2015 in U.S. Appl. No. 14/614,897, filed Feb. 5, 2015.

Office Action mailed Aug. 23, 2017 in U.S. Appl. No. 15/371,047, filed Dec. 6, 2016.

Office Action mailed Jul. 29, 2016 in U.S. Appl. No. 15/142,997, filed Apr. 29, 2016.

Office Action mailed Mar. 14, 2017 in U.S. Appl. No. 15/099,297, filed Apr. 14, 2016.

Office Action mailed May 23, 2017 in U.S. Appl. No. 15/457,921, filed Mar. 13, 2017.

Office Action mailed Oct. 16, 2015 in U.S. Appl. No. 14/614,897, filed Feb. 5, 2015.

Office Action mailed Sep. 7, 2016 for U.S. Appl. No. 15/099,297, filed Apr. 14, 2016.

Office Action mailed Sep. 7, 2017 in U.S. Appl. No. 15/373,298, filed Dec. 8, 2016.

Office Action mailed Sep. 7, 2017 in U.S. Appl. No. 15/374,212, filed Dec. 9, 2016.

Raftery et al., "Variable Selection for Model-Based Clustering," Journal of the American Statistical Association, Mar. 2006, pp. 168-178, http://www.stat.washington.edu/rattery/Research/PDF/dean2006.pdf.

Santos et al., Method of Automated Cyber Risk Assessment, Insurance Underwriting, and Remediation, Cisco Systems, Inc. 2017.

Scarfone et al. NIST Special Publication 800-118. "Guide to Enterprise Password Management (Draft)", Apr. 2009, NIST (National Institute of Standards and Technology), pp. 1-40.

U.S. Appl. No. 14/614,897, filed Feb. 5, 2015.

* cited by examiner

1400

```
┌─────────────────────────────────────────────────────────────────┐
│ Plotting, based on the assessing of risk of the cyber security  │
│ failure in the computer network of the entity, one or more      │
│ features of the entity and other members of a peer group of the │
│ entity, the plotting being configured to visually illustrate the│
│ risk of a cyber security failure in the computer network of the │
│ entity; and                                                     │
│ the automatically recommending of computer network changes      │
│ being based on the plotting.                                    │
│                              1405                               │
└─────────────────────────────────────────────────────────────────┘
                                │
                                ▼
┌─────────────────────────────────────────────────────────────────┐
│ Initiating, in response to the determining that the entity has  │
│ enacted at least a portion of the recommended computer network  │
│ changes, the change or the setting to the at least one element  │
│ of policy criteria of the cyber security policy                 │
│                              1410                               │
└─────────────────────────────────────────────────────────────────┘
                                │
                                ▼
┌─────────────────────────────────────────────────────────────────┐
│ The assessing of risk of the cyber security failure in the      │
│ computer network of the entity comprises assessing, using a     │
│ plurality of sophistication elements for the entity, a          │
│ sophistication for the entity with respect to preventing the    │
│ cyber security failure, the sophistication being one of features│
│ of the entity.                                                  │
│                              1415                               │
└─────────────────────────────────────────────────────────────────┘
                                │
                                ▼
┌─────────────────────────────────────────────────────────────────┐
│ The assessing of risk of the cyber security failure in the      │
│ computer network of the entity comprises assessing, using a     │
│ plurality of motivation elements regarding the entity, a        │
│ motivation of an actor to initiate the cyber security failure,  │
│ the motivation being one of a plurality of features of the      │
│ entity                                                          │
│                              1420                               │
└─────────────────────────────────────────────────────────────────┘
```

```
┌─────────────────────────────────────────────────────────────────────────────┐
│  Assessing, using a plurality of sophistication elements for the entity, a  │
│  sophistication for the entity with respect to preventing the cyber         │
│  security failure, the sophistication being one of a plurality of features  │
│  of the entity; and assessing, using a plurality of motivation elements     │
│  regarding the entity, a motivation of an actor to initiate the cyber       │
│  security failure, the motivation being another one of the features of     │
│  the entity                                                                 │
│                                   1505                                      │
└─────────────────────────────────────────────────────────────────────────────┘
```

Assessing, using a plurality of sophistication elements for the entity, a sophistication for the entity with respect to preventing the cyber security failure, the sophistication being one of a plurality of features of the entity; and assessing, using a plurality of motivation elements regarding the entity, a motivation of an actor to initiate the cyber security failure, the motivation being another one of the features of the entity
1505

Calculating a composite score from a motivation score and a sophistication score, the motivation score representing the plurality of motivation elements, the sophistication score representing the plurality of sophistication elements
1510

Creating an aggregate risk score of a portfolio of entities based on a plurality of motivation scores including the motivation score and a plurality of sophistication scores including the sophistication score; and benchmarking over time at least one of the sophistication score, the motivation score, the composite score, and the aggregate risk score
1515

Identifying clusters of sophistication elements or motivation elements shared between two or more entities of the portfolio of entities, the clusters of sophistication elements or motivation elements being associated with an increase in risk of a cyber security failure in the computer network of the entity
1520

Identifying additional sophistication elements or motivation elements for at least one of the two or more entities of the portfolio of entities that are not shared with the portfolio of entities, the additional sophistication elements or motivation elements being associated with another increase in the risk of a cyber security failure in the computer network of the entity; and generating recommendations for the at least one of the two or more entities of the portfolio of entities that will cause a decrease in the risk of a cyber security failure in the computer network of the entity
1525

*FIG. 15*

INFERENTIAL ANALYSIS USING FEEDBACK FOR EXTRACTING AND COMBINING CYBER RISK INFORMATION

CROSS REFERENCE TO RELATED APPLICATIONS

This application is a continuation of U.S. patent application Ser. No. 17/477,294, entitled INFERENTIAL ANALYSIS USING FEEDBACK FOR EXTRACTING AND COMBINING CYBER RISK INFORMATION filed Sep. 16, 2021 which is incorporated herein by reference for all purposes, which is a continuation of U.S. patent application Ser. No. 16/662,936, entitled INFERENTIAL ANALYSIS USING FEEDBACK FOR EXTRACTING AND COMBINING CYBER RISK INFORMATION filed Oct. 24, 2019, now U.S. Pat. No. 11,153,349, which is incorporated herein by reference for all purposes, which is a continuation of U.S. patent application Ser. No. 15/971,946, entitled INFERENTIAL ANALYSIS USING FEEDBACK FOR EXTRACTING AND COMBINING CYBER RISK INFORMATION filed May 4, 2018, now U.S. Pat. No. 10,511,635, which is incorporated herein by reference for all purposes, which is a continuation of U.S. patent application Ser. No. 15/371,047, entitled INFERENTIAL ANALYSIS USING FEEDBACK FOR EXTRACTING AND COMBINING CYBER RISK INFORMATION filed Dec. 6, 2016, now U.S. Pat. No. 10,230,764, which is incorporated herein by reference for all purposes, which is a continuation-in-part of U.S. patent application Ser. No. 15/141,779, entitled INFERENTIAL ANALYSIS USING FEEDBACK FOR EXTRACTING AND COMBINING CYBER RISK INFORMATION filed Apr. 28, 2016, now U.S. Pat. No. 9,521,160, which is incorporated herein by reference for all purposes, which is a continuation-in-part of U.S. patent application Ser. No. 14/931,510, entitled DIVERSITY ANALYSIS WITH ACTIONABLE FEEDBACK METHODOLOGIES filed Nov. 3, 2015, now U.S. Pat. No. 9,373,144, which is incorporated herein by reference for all purposes, which is a continuation-in-part of U.S. patent application Ser. No. 14/585,051, entitled DIVERSITY ANALYSIS WITH ACTIONABLE FEEDBACK METHODOLOGIES filed Dec. 29, 2014, now U.S. Pat. No. 9,253,203, which is incorporated herein by reference for all purposes.

U.S. patent application Ser. No. 15/141,779 is also a continuation-in-part of International Application No. PCT/US2015/067968, entitled SYSTEM FOR CYBER INSURANCE POLICY INCLUDING CYBER RISK ASSESSMENT/MANAGEMENT SERVICE filed Dec. 29, 2015, which is incorporated herein by reference for all purposes, which is a continuation of U.S. patent application Ser. No. 14/614,897, entitled SYSTEM FOR CYBER INSURANCE POLICY INCLUDING CYBER RISK ASSESSMENT/MANAGEMENT SERVICE filed Feb. 5, 2015, which is incorporated herein by reference for all purposes, which claims the benefit of U.S. Provisional Patent Application No. 62/098,238, entitled SYSTEM FOR CYBER INSURANCE POLICY INCLUDING CYBER RISK filed Dec. 30, 2014, which is incorporated herein by reference for all purposes.

FIELD OF THE PRESENT TECHNOLOGY

The present technology relates generally to systems and methods for determining metrics, such as diversity or similarity, between entities and the application of those metrics as actionable feedback loops which can be used to increase diversity or reduce similarity amongst groups of entities. These metrics may relate to diversity of aggregate cyber security risk for use in planning or filtering new entities so as to increase that diversity.

SUMMARY

Various embodiments of the present technology include a method comprising assessing risk of a cyber security failure in a computer network of an entity, using a computer agent configured to collect information from at least one accessible Internet element. In some embodiments, the at least one accessible Internet element is a social network. In some embodiments of the present technology, the assessing of risk includes evaluating the collected information to obtain circumstantial or indirect information that is indicative of the entity and cross-referencing data in the collected information to confirm or infer that the entity is referenced in the circumstantial or indirect information that is indicative of the entity being referenced in the circumstantial or indirect information. Various embodiments include at least one of increasing or decreasing the assessed risk if the circumstantial or indirect information is negative or positive. Various embodiments also include automatically determining, based on the assessed risk, a change or a setting to at least one element of policy criteria of a cyber security policy, and automatically recommending, based on the assessed risk, computer network changes to reduce the assessed risk, and providing one or more recommended computer network changes to reduce the assessed risk.

Some embodiments of the present technology further include providing one or more recommended computer network changes to reduce the assessed risk, enactment by the entity of at least one of the one or more of the recommended computer network changes to reduce the assessed risk to the entity, and in response to determining that the entity has enacted at least a portion of the recommended computer network changes, automatically reassessing the risk of a cyber security failure in the computer network of the entity based on the enacted recommended computer network changes. Various embodiments of the present technology also include dynamically re-determining, based on the reassessed risk of a cyber security failure in the computer network of the entity, the change or the setting to the at least one element of policy criteria of the cyber security policy.

Some embodiments comprise periodically re-assessing the risk of a cyber security failure in the computer network of the entity over time as the periodic or continual collecting of the information occurs over time, wherein the re-assessing of the risk results in any of: an update to the change or setting to the at least one element of policy criteria of the cyber security policy; and an update to the computer network changes.

Various embodiments of the method include predicting an action of the entity based on the periodic re-assessing. The predicting can utilize machine learning.

Various embodiments of the present technology include a method comprising: collecting information from at least publicly accessible Internet elements, wherein the collection of information occurs periodically or continually over time, evaluating the collected information to obtain circumstantial or indirect information that is indicative of an entity, matching the obtain circumstantial or indirect information to entity information included in a database, cross-referencing data in the collected information with the information in the database to confirm or infer that the entity is referenced in the circumstantial or indirect information that is indicative of the entity being referenced in the circumstantial or indirect information, and outputting a list that includes an identification of one or more entities based on the matching.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 14 is a flowchart of another example method of the present technology.

FIG. 15 is a flowchart of yet another example method of the present technology.

DETAILED DESCRIPTION

Figure 1:
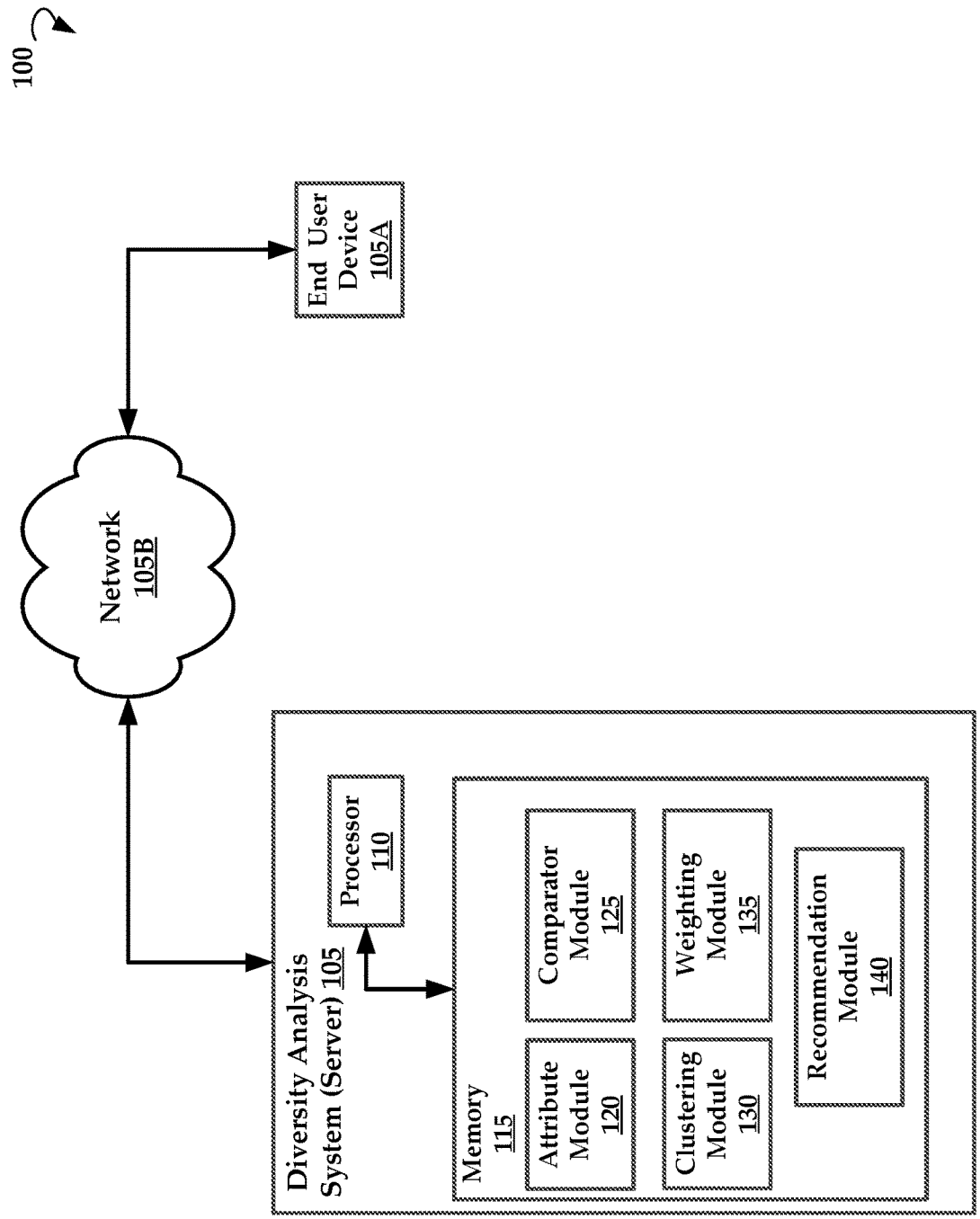
FIG. 1 is a high level schematic diagram of computing architecture for practicing aspects of the present technology.

Various embodiments of the present technology are directed to systems and methods for determining diversity and/or similarity between entities with respect to risk, (e.g., cyber security risk), and the utilization of these metrics in various ways to improve diversity between the analyzed entities. In one embodiment, an insurer may desire to understand the diversity of their insured entities with respect to aggregate cyber risk and utilize a measure of diversity to prevent too much similarity between insured entities, and/or to compare their diversity to their industry peers. Additionally, reinsurers, rating agencies and/or insurance brokers may also utilize the present technology. For example, reinsurers may want to compare one insurer's portfolio to another insurer's to buy, invest, and/or cover. Brokers may wish to review their portfolio of clients, and ratings agencies may review an insurer's portfolio and use it to provide a rating on the financial strength rating of the insurer. To be sure, cyber insurance and other insurance risks can be a function of similarity. For cyber insurance risk, if insured entities are very similar to one another in a variety of key attributes such as revenue, clientele, industry, technology utilized such as cloud computing service provider, content delivery network (CDN) provider, operating system, firewall vendor, intrusion detection system vendor, security services provider, etc., or other factors, a loss, (e.g., due to a cyber attack), by one of these insured entities might imply that other insured entities having similar attributes will also experience a loss. For example, a plurality of web hosting provider may source their servers from the same company. A cyber attack of that company's servers may equally affect all of these web hosting providers that use the server, and consequently affect an insured that utilizes one of those web hosting providers to host the insured's website and other web services.

To be sure, diversity in attributes between entities can decrease the likelihood that a covered loss by any particular entity will also likely affect the other entities. Thus, the desire is to have the insured entities be as diverse as possible in the aggregate, to reduce overall risk. Conversely, similarity of attributes between insured entities can increase risk for the insurer.

Using the present technology, an end user may determine similar attributes shared between pluralities of entities. These shared attributes can be aggregated into clusters to locate groups of entities with shared attributes. In one example, several entities use the same content delivery network (CDN), the same cloud service provider, a similar website traffic profile, have overlapping executives, and report similar revenue. While these entities may also share attributes with other entities, these attributes are used in various embodiments to create a cluster or grouping of entities that, when considered in the aggregate, have a low diversity score due to the similarities in this example.

End users may use the present technology to learn their aggregate cyber risk compared to industry peers and use that information to, for example, screen potential target entities for inclusion into a group based upon how the potential addition of their attributes to the group would affect the diversity score for the end user's collection of entities. In alternative exemplary embodiments, the system may instead of, or in addition to, outputting a diversity or clustering score, may output a different value analyzing the entities, for example, a probable maximum loss (PML) and/or an expected portfolio value.

The present technology can be used to analyze diversity/similarity between many entities. The diversity/similarity analyses can use hundreds and even thousands of attributes, looking for diversity or commonality therebetween. In some instances, the end user can adjust the attributes and/or select which attributes are important to them and the system will analyze only these attributes when determining diversity, (e.g., a diversity score for aggregate cyber risk).

While the examples above mention the suitability of the present technology for use with insurance planning, in general, and cyber insurance planning, in particular, the present technology is not so limited. Other examples of technologies that can implement the present technology are financial portfolio managers, technology companies that desire infrastructure robustness, human resources, venture capital investment, and so forth.

These and other advantages of the present technology are provided below with reference to the collective drawings.

FIG. 1 is a high level schematic diagram of a computing architecture (hereinafter architecture 100) of the present technology. The architecture 100 comprises a diversity analysis system 105 (hereinafter also referred to as system 105), which in some embodiments comprises a server or cloud-based computing device configured specifically to perform the diversity analyses described herein. That is, the system 105 is a particular purpose computing device that is specifically designed and programmed (e.g., configured or adapted) to perform any of the methods described herein.

The system 105 can be coupled with end user device 105A, such as computer, tablet, Smartphone, or other similar end user computing device. End users can interact with the system 105 using their end user device 105A. The end user device 105A and system 105 can be coupled using a network 105B.

A suitable network 105B may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

In one embodiment, the system 105 comprises a processor 110 and memory 115 for storing instructions. The memory 115 can include an attribute module 120, a comparator module 125, a clustering module 130, a weighting module 135 and a recommendation module 140. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

For context, the diversity analyses according to various embodiments of the present technology begin with input for the attribute module 120. A set of variables that are indicative of attributes of an entity may be input into the attribute module 120. In one embodiment, the variables can include technologies a company might employ (e.g., internally and externally for Internet communication such as e-mail, website, and social media online presence) such as CDN provider, cloud service provider, server type, OS type, visitor traffic knowledge, customer profiles, as well as other non-technical information such as revenue, number of employees, years in business, and so forth. In various embodiments, the breadth and type of variables that can be analyzed and correlated are unlimited. In some embodiments, the breadth and type of variables that can be analyzed and correlated for the company and for their industry peers, for comparison, may be limited by breadth and type of information that is available at online sources concerning the same. Again, an end user can define or specify the types of variables that are of interest to them.

For example, if the end user is an insurer, the insurer may desire to know how diverse their insured entities are with respect to cyber security risk relative to a wide and divergent set of variables. In regard to a cloud computing provider, for example, interest in such diversity may be only in technological variables such as traffic, page views, bandwidth, and other variables related to cyber risk.

In some embodiments, entities and end users can access and interact with the system 105 using a variety of graphical user interfaces (GUIs) such as a dashboard, including various elements as described herein. The system 105 can use the dashboard to display messages or notifications as well as diversity scores, similarity scores, and/or recommendations.

The system may gather variables for an entity by querying the entity for information, collect information from available online sources such as websites, corporate filings, news sources, other public record databases and resources. Additionally, data may be gathered from the entity's network using devices already present there or by placing a new device on the entity's network to gather more data. The data collecting device may be a server, router, firewall, switch, or repeater, or may be a software agent or routine that monitors traffic and/or performs packet inspection. The data collecting device may be on the company's network and/or its periphery, and may collect and/or analyze the data, while also transmitting it to system 105. In this manner, additional, proprietary data may be gleaned from a particular entity's network. Regardless of how the variables are obtained, the variables are input into the attribute module 120. The attribute module 120 can format or normalize the input as needed for consistency.

In one embodiment, the comparator module 125 is executed to perform a variable comparison on all or a subset of the variables. The comparison can be for all or only a subset of all entities. The subset of variables can be selected by the end user, as well as the entities analyzed.

The comparator module 125 is configured to identify variables shared between entities or groups of entities. The implications of this analysis are multifaceted. For instance, the same variable can be shared between many entities, which leads to an inference that a particular variable might be problematic. This lack of diversity is a more pointed or granular lack of diversity.

In another example, multiple variables are shared between numerous entities. This diversity relationship between the entities signifies a more prolific lack of diversity.

Localized commonality can be found between small groups (even between two) entities. This type of similarity can be inferred as less problematic than the more prolific examples provided above where similarity exists between numerous entities.

The comparator module 125 can cooperate with the clustering module 130 to create commonality clusters (e.g., various clusters of commonly shared variables). In one embodiment, if five entities are being analyzed, many different clusters can be identified. By example, if variables A-D are being analyzed with respect to entities 1-5, the comparator module 125 finds commonality between entities 1 and 3 with respect to variables B and C. Also, the comparator module 125 finds commonality between entities 1-5 with respect to variable A. Other similar correlations can be found.

The clustering module 130 can display to the end user these commonality clusters, which indicate areas of non-diversity. Also, these commonality clusters can be utilized by the recommendation module 140 to create action items for the end user that if enacted would change the diversity score. Details regarding the diversity score are found in greater detail below.

In some embodiments, the comparator module 125 creates a diversity score or index. This diversity score represents how dissimilar the analyzed group of entities is relative to one another in view of their variables.

The diversity score can include a percentage of the overall number of compared variables that are dissimilar to those that are shared. The diversity score can be represented variously as a fraction, a decimal, or a percentage, and may be included in the graphical user interface (e.g., dashboard.) Additionally, or alternatively, the diversity score may be normalized into a number within a user-defined, or pre-defined, range, similar to a credit score.

In some embodiments, the comparator module 125 can cooperate with the weighting module 135 to applying a weighting to one or more variables. In one embodiment, the weighting is selected by an end user such as an insurer. For example, an insurer determines that industry serviced, gross revenue, and customer country of origin are important variables to analyze, (e.g., for assessing individual and aggregate cyber risk.) For instance, if the insurer knows that gross revenue is very important to the calculation, the insurer can specify that the gross revenue variable is to be given greater importance in the analysis than other variables. In another example, the insurer can assign a weight to each variable based upon importance.

In some embodiments, the system can determine weightings and variables based on industry knowledge acquired, and use machine learning, big data and other "tools" to make an "educated" determination. For example, the weighting of variables can also be determined by the system 105 based on information such as actuarial data, industry practices, or other rules established by end users but which are intended to be applied by default. The selection of a weighting schema by the system 105 can be based on variables for the entities. For example, if the system 105 determines that the entities are all physicians, the system 105 can select weightings that are appropriate for medical practices or hospitals. Such determinations by the system may be adjusted and/or otherwise specified by the end user (e.g., using the dashboard) to tailor them for their particular circumstances, preferences, or other factors.

In some embodiments, the diversity score can be represented as a diversity graph that illustrates the connection between entities. Entities can be graphically connected based on commonality of variables between entities. For example, certain entities may be connected as being banks that present particularly enticing targets for cyber criminals and thus particular cyber risks.

In response to calculating a diversity and/or similarity score, the recommendation module 140 can be executed to provide the end user with some type of actionable feedback. For example, the recommendation module 140 can provide the end user one or more actions to the end user based on the diversity score and the clusters of similar variables. These one or more actions potentially increase the diversity score if enacted by the end user.

In one example, the recommendation module 140 can automatically identify variables, which if changed, would affect the diversity score. For example, if the entities are or utilize technology company service providers that use a particular CDN, the recommendation module 140 can output a recommendation that diversification in this area would be beneficial. The end user can alert the entities and encourage them to explore other options for CDNs. If the end user is an insurer, for example, the insurer can encourage this change by offering rate concessions to the insured entities. Various embodiments of the system thus may automatically provide the diversity score or other information to the end user regarding diversity, which the end user can utilize to encourage or effect various changes (e.g., via rate concession, screening of potential new entities, adjusting rates based on diversity, or other actions prompted by the system's determinations.) The diversity score might also be used to inform the insurer as to which polices should be renewed and which polices should not be renewed. For example, if a potential new (target) entity to add presents an unacceptable cyber risk, based on the diversity analysis, the insurer may choose not to provide the entity' policy or to provide the policy at a rate commensurate with the risk.

In another example, the recommendation module 140 can identify problematic common variables that negatively impact diversity scores. For example, the recommendation module 140 may identify shared infrastructure such as CDNs and cloud service providers as particularly problematic variables that are commonly shared between several entities. In some embodiments, the recommendation module 140 can also identify network traffic, network traffic patterns, firewalls, firewall policies that are commonly shared. Changing these shared variables would likely increase the diversity score for these entities. Conversely, the recommendation module 140 can determine key variables that if changed would negatively affect a diversity score. The recommendation module 140 can identify these variables to the end user as desirable.

Actions that could be taken in response to this information could include a project plan that specifies that the insurer is to find new customers that do not share these problematic variables. Likewise, the project plan could also or alternatively specify that the insurer is to find new customers that do share key positive variables.

In one example, an action includes the recommendation module 140 creating and providing the end user with a variable profile of a target entity that when added to the plurality of entities increases the diversity score. For example, the recommendation module 140 could create a profile for a prototypical new client that is in a different technology sector or a completely different industry sector. In another embodiment, the recommendation module 140 could create a profile for a prototypical new client that includes desirable variables, rather than merely a client that excludes certain disfavored variables.

In one embodiment, the recommendation module 140 can provide the end user with a list of entities of the plurality of entities that are lowering the diversity score. Again, as mentioned above, certain clusters of variables may be found in common between entities. Certain ones of these clusters may have more of a negative impact on the diversity score than others. For example, commonality between headquarters or domicile may have no impact on the diversity score, even if this variable is shared in common between several entities. On the other hand, commonality in gross revenue or average employee age may have a drastic impact on the diversity score for one reason or another. To be sure, commonality of a variable(s) does not always negatively affect the end user or the end user's business. In these instances the commonality can be ignored or weighted so as not to affect the calculated diversity score.

In another example, the recommendation module 140 can provide the end user with a list of entities of the plurality of entities that, if lost would lower the diversity score, which can prompt the end user to take action to avoid.

In another example, action the recommendation module 140 can compare a variable profile for a new entity to determine if the addition of the new entity to the analysis will negatively or positively impact the diversity score of the group.

For example, the attribute module 120 can receive a variable profile for a new entity and parse out the variables which are indicative of attributes of the new entity. This profile could include an application form, a survey, or any other content that is capable of conveying variables.

Next, the comparator module 125 adds a set of variables of the new entity to the comparison described above and repeats the calculation of the diversity score. The recommendation module 140 can alert the end user if the addition of the new entity decreases the diversity score. The recommendation module 140 can alert the end user if the addition of the new entity increases the diversity score as well.

In some embodiments, the recommendation module 140 updates the diversity score based on feedback received from the end user. For example, if the end user wants to view how the addition of a proposed new client will affect an existing diversity score, the profile for the new client is added to the system and the variables for the new client are processed and added to the comparison process. A new or updated diversity score is calculated and displayed to the end user.

The difference between the new diversity score and the old diversity score is expressed as a diversity delta. In some embodiments, the system 105 can apply thresholds to the diversity delta to determine if a proposed change to the entity grouping is sufficient to warrant the proposed change. For example, the system 105 may require at least a net change or diversity delta of 20%. Other percentages can also be utilized. The present technology provides information related to the updated information (the new diversity score), including differences (the amount of the change made in one or more updates, namely the delta), and trends (patterns over many time steps).

The present technology also provides attribution information when a diversity score changes. In particular, the methods and system indicate to a user why the score has changed, namely what exactly has changed in the underlying data sets to effect that higher level score change. In this manner, the systems and methods of the present technology provide detailed information to the user to identify the changed data, and thereby understand the positive and negative impacts of the user's actions on the diversity score.

The system 105 can also build an entity portfolio for an end user with knowledge gained from an analysis of variables for a plurality of entities. For instance, the system 105 can create a report that informs the end user as to how many and what type of entities a portfolio should have to be balanced in terms of diversity, (e.g., with respect to cyber risk.) For example, the report may indicate that an insurer should have a certain percentage of clients in the banking sector, a certain percentage in the technology sector, and a certain percentage in the medial industry. These sectors of the portfolio are deduced by comparing variables for various entities in a given industry that lead to a suitable diversity score.

It will be understood that the diversity score can be counterbalanced by other factors such as revenue for the end user. That is, an insurer may be more likely to accept a lower diversity score from a group of entities that pay higher premiums or a group of entities that is at least partially self-insured.

Figure 2:
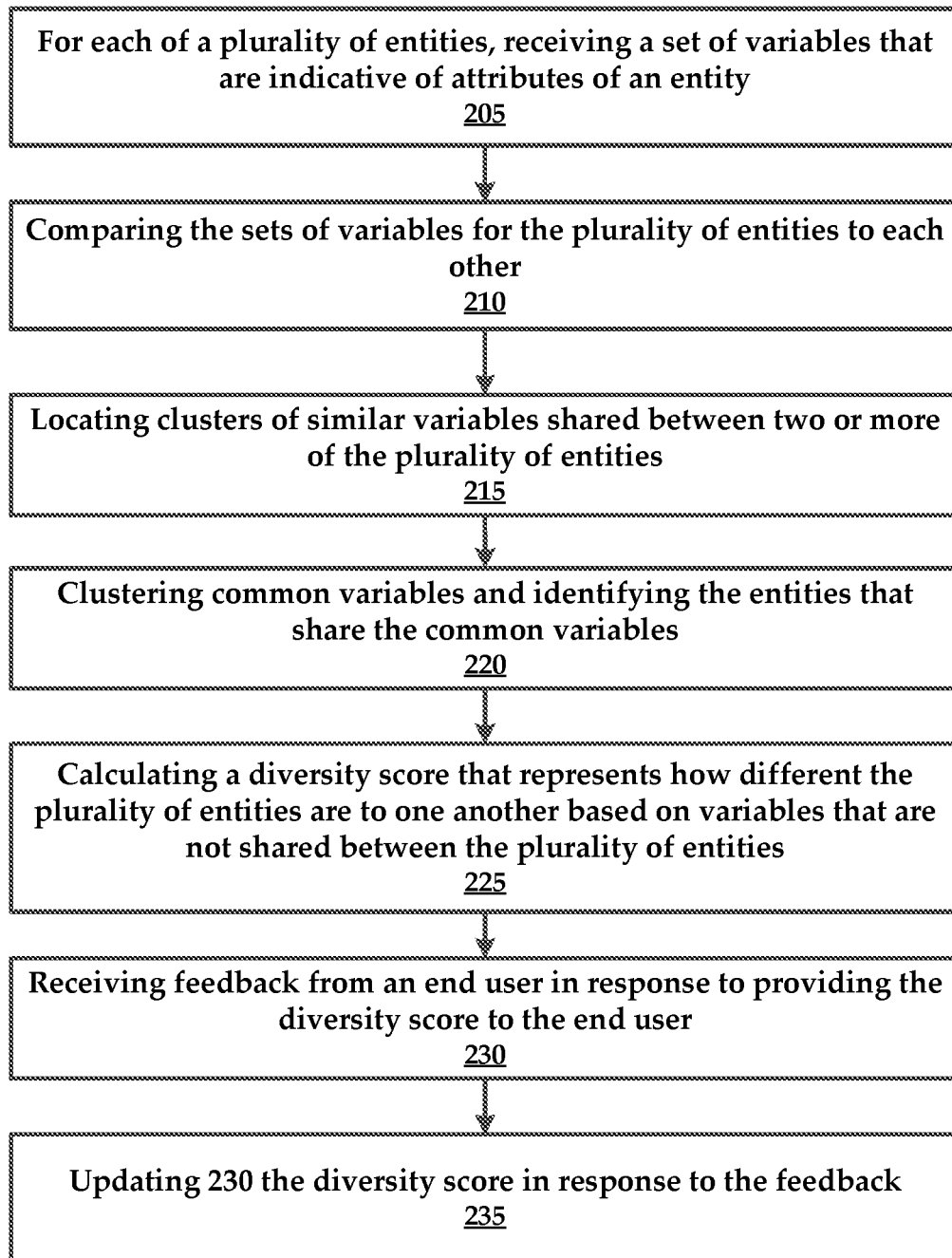
FIG. 2 is a flowchart of an example method for determining entity diversity.

FIG. 2 is a flowchart of an example method 200 that is executed by the system (e.g. system 105), in accordance with the present technology. The method 200 includes the system 105 (for each of a plurality of entities), receiving 205 a set of variables that are indicative of attributes of an entity. These variables can include any number or type of variables that represent the attributes of the entity.

These variables are collected for numerous entities that may belong, in some embodiments, to a particular class or group. For example, the entities could include all employees in a company, all insured customers of an insurance agency, investors in a mutual fund, or other groups.

Next the method 200 includes the system 105 comparing 210 the sets of variables for the plurality of entities to each other, and locating 215 clusters of similar variables shared between two or more of the plurality of entities.

Next, the method 200 includes the system 105 clustering 220 common variables and identifying the entities that share the common variables. These clusters are indicative of non-diversity between these entities.

Next, the method 200 includes the system 105 calculating 225 a diversity score that represents how different the plurality of entities are to one another based on variables that are not shared between the plurality of entities. This diversity is directly related to the commonality discovered above. The more similar or commonly shared variables exist, the less diverse the entities are relative to one another, as a general rule. Again, as mentioned above, some variables will have little to no impact on diversity as dictated by weighting or variable selection by the end user. For example, if a commonly shared variable is not included in the diversity calculation by the end user the variable has no impact on the diversity score.

Next, the method 200 includes the system 105 receiving 230 feedback from an end user in response to providing the diversity score to the end user. Also, the method 200 includes the system 105 updating 235 the diversity score in response to the feedback.

Various types of feedback are contemplated and illustrated in FIG. 2. The feedback can take the form of a suggestion, option, report, or other output that is actionable by the end user. Exemplary methods and systems according to the present technology may also provide benchmarking over time. In this manner, an insurance company or other entity tracking aggregate cyber risk may track their diversity score over an adjustable time period, for example, days, weeks, months, and/or years.

It will be understood that the methods illustrated in flowchart form are susceptible to execution in various forms such that not all steps may be required. In some instances, additional steps can be added. Some steps may be rephrased or replaced with other steps, in accordance with the claimed technology.

Figure 3:
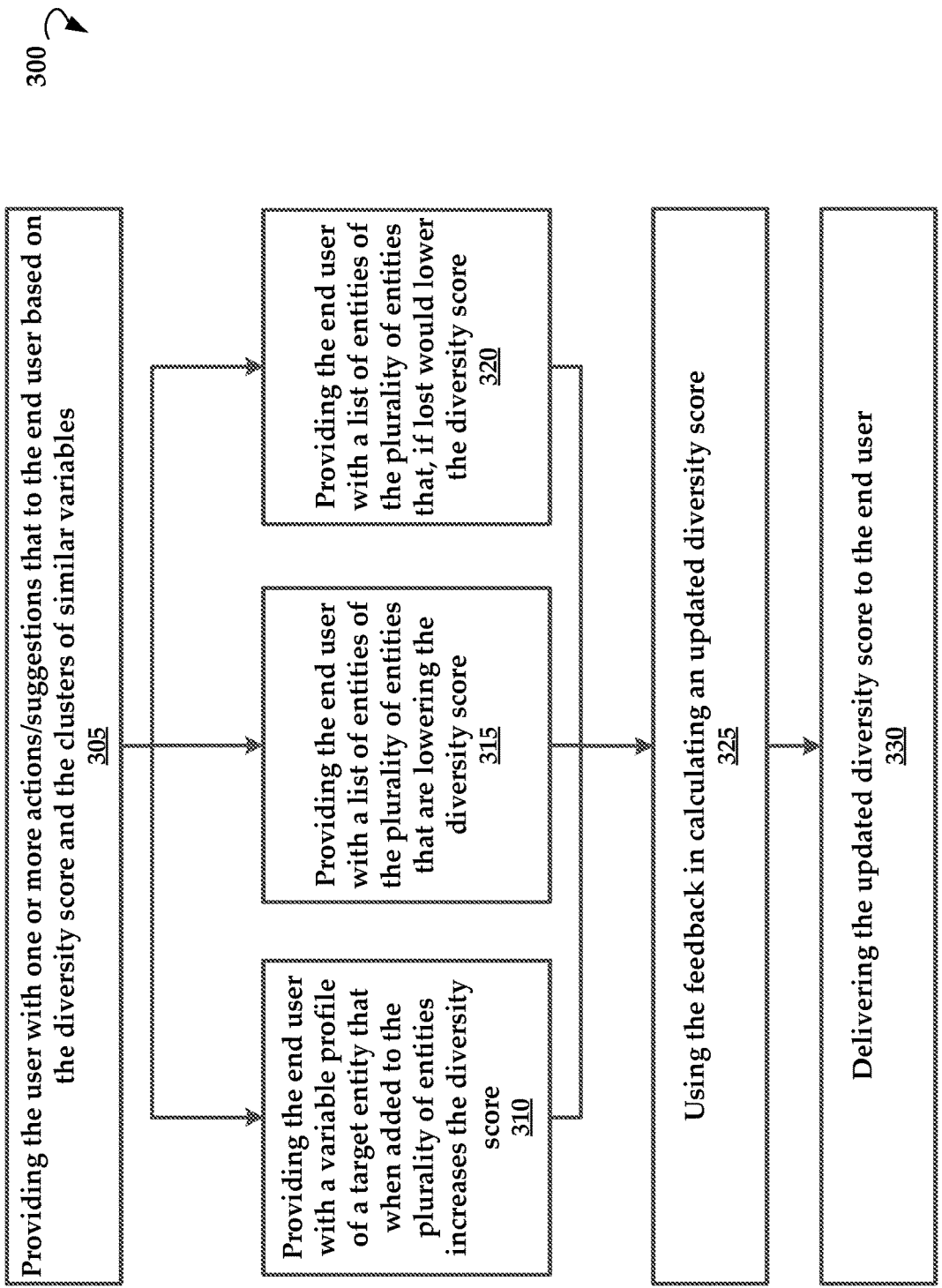
FIG. 3 is a flowchart of an example action and feedback loop method for updating a diversity score and improving client diversity.

In FIG. 3, the flowchart illustrates the method 300 including the system 105 providing 305 the user with one or more actions/suggestions that to the end user based on the diversity score and the clusters of similar variables. These actions can potentially increase the diversity score if enacted by the end user.

In step 310, an action includes providing the end user with a variable profile of a target entity that when added to the plurality of entities increases the diversity score.

In step 315, an action includes providing the end user with a list of entities of the plurality of entities that are lowering the diversity score.

In step 320, an action includes providing the end user with a list of entities of the plurality of entities that, if lost, would lower the diversity score.

Regardless of the action taken (steps 310, 315, and/or 320), the feedback is used in calculating 325 an updated diversity score and delivering 330 the updated diversity score to the end user.

Again, these options are merely examples and are not intended to be limiting. These options can be provided individually or in combination, if desired.

Figure 4:
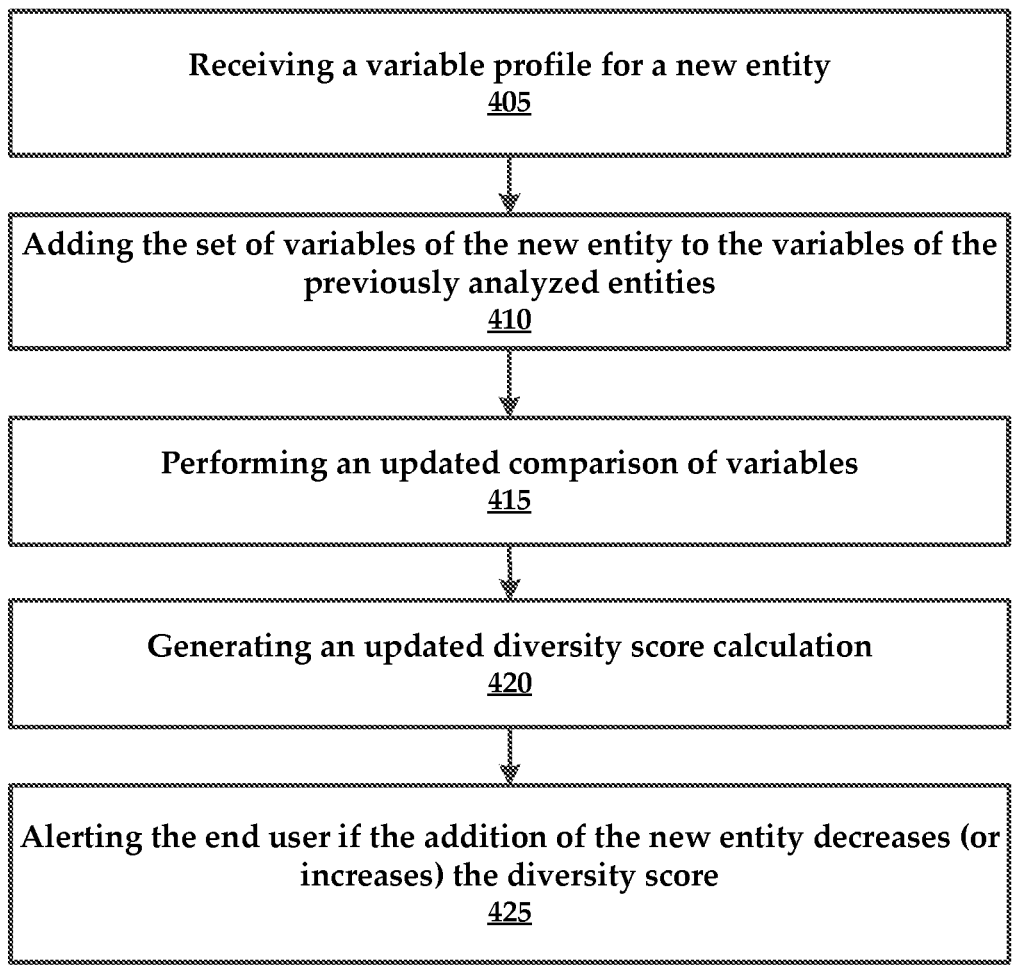
FIG. 4 is a flowchart of a method for analyzing a new client's impact on an existing diversity calculation.

FIG. 4 is a flowchart of a new entity analysis method 400. In the method 400, the system (e.g. system 105) is utilized to compare the variables of a new entity to an existing diversity analysis. For example, an insurer desires to determine how the addition of this new entity will affect the diversity of an existing client base. This aggregate risk analysis can be used to ensure that diversity is maintained or increased when a new client is added to an existing pool of clients.

The method 400 includes receiving 405 a variable profile for a new entity. The variable profile either includes a set of variables or a set of variables is deduced from the variable profile. As mentioned above, the variable profile can include an application form, a resume, a corporate filing such as a tax return, or any other document that includes attributes of an entity.

Next, the method 400 includes adding 410 the set of variables of the new entity to the variables of the previously analyzed entities and performing 415 an updated comparison of variables. Next, the method 400 includes generating 420 an updated diversity score calculation.

In some embodiments, the method 400 includes alerting 425 the end user if the addition of the new entity decreases (or increases) the diversity score. The end user can decided to accept or reject this new client based upon how the client affects the diversity score.

Advantageously, the present technology can be used in scenarios where diversity of clientele is desirous. The present technology can perform diversity analyses on potentially thousands of attributes across countless entities in ways that would be impossible to accomplish absent the use of the diversity analysis system. The diversity analyses of the present technology can bring clarity to business planning and project management, where integration of new clients/entities may affect the diversity of a current client base (either positively or negatively). Where diversification is desirable or required, the present technology provides a means for facilitating and maintaining this diversity in a way that is actionable and usable to the end user. That is, the present technology provides a way for end users to mitigate risk through diversification of their customer base or however diversity impacts their particular business or operations.

Various embodiments of systems and methods are provided for assessing and reducing cyber risks associated with companies or other entities. In various embodiments, a method comprises assessing risk of a cyber security failure in a computer network of an entity, using a computer agent configured to collect information from at least publicly accessible Internet elements. The cyber security failure may include a cyber attack and/or a privacy incident (including but not limited to an incident involving sensitive information), to name just a few. The computer agent may be further configured to collect and/or analyze information from the computer network of the entity.

The exemplary method includes automatically determining, based on the assessed risk, a change or a setting to at least one element of policy criteria of a cyber security policy. The cyber security policy may be a policy from an insurance company, a product warranty for first and/or third party costs that an entity purchases from one of a networking, security product, or services provider, to name a few. In various embodiments, the method includes automatically recommending, based on the assessed risk, computer network changes to reduce the assessed risk and providing one or more recommended computer network changes to reduce the assessed risk, enactment by the entity of at least one of the one or more of the recommended computer network changes to reduce the assessed risk to the entity. In some embodiments, the exemplary method includes determining that the entity has enacted at least a portion of the recommended computer network changes, and in response, and automatically reassessing the risk of a cyber security failure in the computer network of the entity based on the enacted recommended computer network changes. The exemplary method further includes dynamically re-determining, based on the reassessed risk of a cyber security failure in the computer network of the entity, the change or the setting to the at least one element of policy criteria of the cyber security policy. In various embodiments, the at least one element of policy criteria of the cyber security policy is a term and/or a condition. For example, a term and a condition may include a retention amount, a deductible, a premium, a coverage limit, a future valuation, a term length, and so forth.

Various embodiments of systems and methods are provided for calibrating cyber risks associated with commercial markets. In various embodiments, a method comprises assessing the risk of a cyber security failure in a computer network of a commercial market, using a computer agent configured to collect information from at least publicly accessible Internet elements. The cyber security failure may include a cyber attack and/or a privacy incident (including but not limited to an incident involving sensitive information), to name just a few. The computer agent may be further configured to collect and/or analyze information from the computer network of the commercial market. In some embodiments, the commercial market is insurance, corporate credit, small business loans, global equities, derivatives, or futures, to name just a few. In various embodiments, the policy is a policy from an insurance company, or a warranty, to name a few. In various embodiments, the method includes automatically recommending computer network changes to reduce the assessed risk; and automatically reassessing the cyber risk of the computer network of the commercial market based on the recommended computer network changes. In some embodiments, the entity is a commercial market for at least one of insurance, corporate credit, small business loans, global equities, derivatives, and futures. In various embodiments, the method includes calibrating cyber risks associated with the commercial market.

In some embodiments, the method includes, based on the assessing of risk of the cyber security failure in the computer network of the entity, plotting one or more features of the entity and other members of a peer group of the entity, the plotting being configured to visually illustrate the risk of a cyber security failure in the computer network of the entity; and the automatically recommending of computer network changes being based on the plotting. The plotting may be configured to visually illustrate the cyber risk of the entity.

In some embodiments, the method comprises determining a sophistication score of the entity with respect to cyber risk, which may be considered the quality of the defense with respect to repelling, defeating, or preventing a security failure. Sophistication scores may also be referred to as susceptibility scores.

In some embodiments, the method also comprises determining a motivation score of a hacker or other actor with respect to initiating one of a cyber security failure. A composite score may be created from the motivation score and the sophistication score. In other embodiments, the motivation score and the sophistication score may be derived from the composite score.

The exemplary method and system may be used in a cyber policy market, and/or by a cyber policy provider providing policies. The cyber policy may include a cyber risk assessment/management service, which may provide feedback to one or both of the policy company and the insured entity, enabling the entity to determine how to reduce their cyber risk, and/or how they are positioned within their peer group and/or within a universe of companies with respect to their cyber risk. As used herein, the policy, including but not limited to a cyber policy, may be a policy from an insurance company or it could be a product warranty for first and/or third party costs that an entity purchases from a networking or security product or services provider.

Additionally, following the recommendations may enable the policy company to update and/or change policy criteria of a cyber security policy. In still further alternatives, the composite score of several or many entities may be aggregated and used by insurance companies, reinsurance companies, brokers and/or ratings agencies to understand and/or evaluate an aggregate risk and assess insurance premiums and/or reinsurance treaties and/or change or evaluate a credit rating. This is described in further detail above.

Also, as mentioned above, the composite store can include facets of creditworthiness, small business risk, and other commercial metrics of commercial risk.

Cyber insurance insures entities against damage and/or loss due to security failures (e.g., a cyber attack, a privacy incident). Assessing cyber risk can be a difficult task due to the volatility of the cyber environment. For example, a risk of a security failure such as a cyber attack lacks actuarial data since there is an active adversary behind cyber attacks, and past cyber attacks do not predict future cyber attacks. Better analysis of cyber risk, including the risk of security failures, and providing greater service to insurance companies and insured entities, is desirable The technology disclosed herein provides a cyber risk assessment, and provides methods and systems for improving a cyber risk assessment, by, for instance, reducing a risk of a cyber attack, predicting the probability of a cyber attack, and/or determining the extent to which a cyber attack might cause damage. Exemplary methods plot the cyber risk within a peer group, which may be defined by industry, revenue, and/or any other appropriate metric. Various exemplary methods plot the cyber risk within the universe of companies, (e.g., universe of companies for which such cyber risk has been assessed. Exemplary methods assess risk in a plot using one feature. In other examples, multiple features may be plotted into a matrix.)

For those exemplary matrix embodiments, the assessment of risk is plotted with a two (or more) dimensional analysis, which may be plotted into a two by two matrix or graph, or in any appropriate alternative visualization method, particularly for greater than two dimensions. For example, the two dimensions may be characterized as 1) motivation (which may be synonymous or similar to offense, e.g., the motivation of a bad actor to attack an entity) and 2) sophistication (which may be synonymous or similar to defense, e.g., the sophistication of an entity to prevent and/or repel a cyber attack, or compel more responsible behavior from employees and associates to prevent a privacy event with respect to sensitive information). Alternative axes for the two dimensional analysis are also possible, for example, measurements other than motivation and sophistication. The system may output an estimated (or expected) commercial impact, which may encompass both the risk of a cyber attack, and the potential amount of damage caused by a cyber attack.

In addition to analyzing the cyber risk, the present technology may provide enhanced value by quantifying a cyber risk, thereby creating a market for it. Additionally, the present technology may provide a cyber risk management service tied to a cyber policy. A cyber policy (also referred to as a cyber insurance policy) as used herein includes any insurance policy covering any loss arising out of a security failure, including tangible and intangible property. The policy may cover both first party and third party losses arising out of any perils including a security failure. The policy may cover business interruption, loss of income, Director and Officer liability, information asset coverage, and extra expense coverage, or any other insured loss arising out of a security failure. A cyber policy as used herein includes security and privacy coverage, including regulatory coverage (e.g., FTC, Health Insurance Portability and Accountability Act (HIPPA)) covering fines and penalties, and defense costs and damages. The coverage provided by a cyber policy as used herein may provide for privacy breach coaches, forensic experts, a public relations campaign, cyber extortion, information asset recovery, business interruption (including for example, lost income, extra expenses, and/or all costs incurred but for the cyber security failure), or any other covered costs or losses.

Aspects of a cyber policy may be altered based on use of, and implementation of recommendations provided by, the cyber risk management service. These aspects may include any policy criteria of the policy. Elements of policy criteria include, for example, a retention amount, a deductible, a premium, coverage limits, future valuation, term length, or a term or condition of the policy.

The analysis may be a position on a graph, and may include a scatterplot of the peer group members, and/or a simple ranking amongst the peers. The analysis may be two (or more dimensional). Additionally or alternatively, the analysis may be resolved into a single composite score embodying the analysis. The plot may be changed to include more or fewer members of the peer group based on further variables of the peer group members, for instance, revenue, etc. The plot may include points for a universe of companies along with the points for the particular entity. For a two dimensional analysis example, each axis may be a function of many sub-variables, discussed herein as examples of motivation and sophistication. The sub-variables may be weighted equally, or differently, and the weighting may be static, dynamic, or customizable based on different analysis goals. Examples of motivation and sophistication elements will be described in greater detail below. In some embodiments, a motivation score and a sophistication score, for the motivation and sophistication sub-variables can be derived from the single composite score.

The exemplary assessment system may provide recommendations to an entity to improve their cyber risk assessment, by, for instance, reducing their cyber risk. This may be accomplished by various methods, including increasing the sophistication of the organization or entity, or decreasing the motivation of the attacker to go after this organization or entity. The recommendations may be specific and may impact one or both of the axes of the two dimensional risk analysis. Implementing the recommendations, which may be accomplished in some embodiments automatically, may reduce the risk of a cyber security failure.

Figure 12:
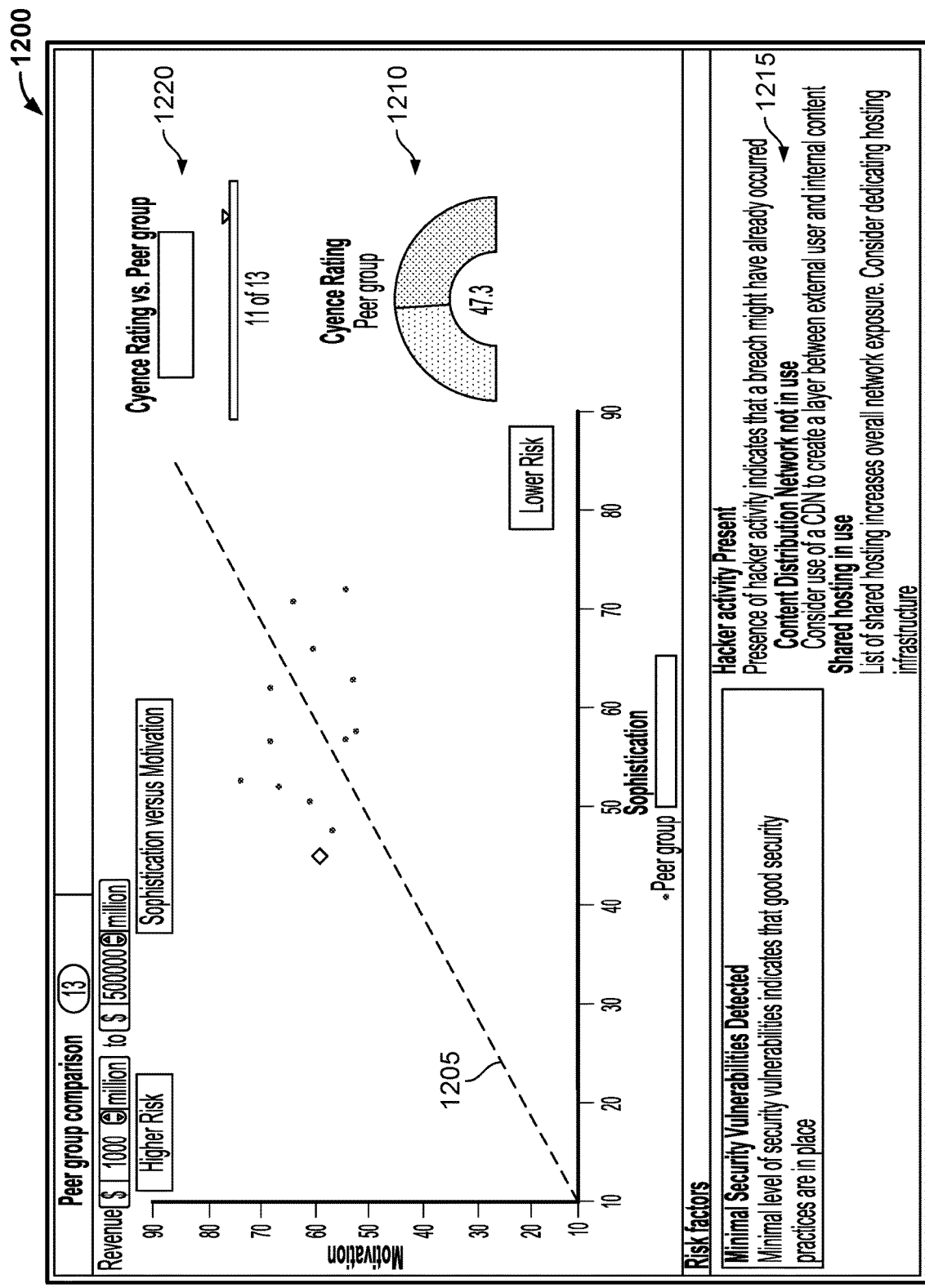
FIG. 12 is an example graphical user interface (GUI) that comprises a scatter plot that represents a plurality of entities plotted according to their combination score, as well as additional graphical representations for an entity and a list of recommendations based on the plotting.

Implementing the recommendations may impact an entity's relative position in their peer group, in a universe of companies, as well as any expected commercial impact of a security failure (e.g., a cyber attack, a privacy incident). Additionally, factors beyond the control of the company or entity, for instance, actions by the other peer group members, activity in the hacker community or vulnerabilities in software and/or hardware, may also impact both a relative risk analysis (e.g., impacting the company or entity's position in their peer group) and/or an absolute expected commercial loss. This change over time may be accessible and/or charted for trending information, which may be useful for planning and/or changing policy criteria (including the premium) for the policy. An entity may make a judgment of which recommendations to prioritize in implementation based on the different recommendations provided by the system to other members of their peer group. Examples of recommendations are illustrated in FIG. 12.

In some embodiments, the recommendations generated for an entity can be changed in comparison with other entities in a group. Thus, the system 505 can provide a first set of recommendations based solely on the motivation and/or sophistication (e.g., cyber risk) analysis for the entity.

In another example, the system 505 can generate a second set of recommendations based on a comparison of the cyber risk for the entity to the aggregate risk score for many entities. This second set of recommendations includes additional recommendations for the entity which are determined to improve the cyber risk of the entity.

In some embodiments, the system 505 can determine risk factors that are discrepant between the entity and another entity (or an aggregate group of entities) and highlight these recommendations as being unique for the entity. For example, if the entity is the only one out of a group of their peer entities that does not use a CDN (content delivery network), the system 505 can highlight this difference. These unique discrepancies can illustrate areas where the entity is particularly or uniquely vulnerable.

Stated otherwise, the system 505 identifies clusters of sophistication elements or motivation elements that are shared between two or more of the portfolio of entities. The clusters of sophistication elements or motivation elements being associated with an increase in cyber risk. The recommendations generated by the system 505 for an entity of the portfolio of entities will cause a decrease in the cyber risk if implemented.

In various embodiments, where scores are tracked over time, the system 505 can also be configured to periodically reassess the cyber risk of an entity. In some embodiments, the reassessment occurs after the entity has implemented one or more of the recommendations.

It may be advantageous for the entity to understand not only that a particular score was changed, but also what affected the change in score. Thus, the system 505 is configured to provide attribution for a score change, including verifiable data including time and attribution information. This attribution identifies/represents the underlying data set which affected the score change, and shows why, how much, and how the score changes.

By way of example, the entity, unbeknownst to them, has a dramatic increase in pageviews on their website. This increase in pageviews causes an increase in the motivation score for the entity. That is, the increase in pageviews indicates that a hacker might be more motivated to hack the entity's webpage because of its high traffic profile.

In some embodiments, the system 505 can be used to automatically institute changes on behalf of the entity that will decrease the likelihood that the entity will experience or be adversely affected by a security failure such as a cyber attack. These automatic changes occur based on the recommendations generated for the entity.

In one example, the system 505 can establish new content hosts for the content of the entity. The system 505 can inform the entity that diversity in content hosting can decrease the likelihood that all of the entity's content or user information will be exposed, as compared to if the content is stored in one centralized location. To be sure, the system 505 can be used to automatically change technical aspects of the entity, such as computing diversity, content distribution and delivery, and other technical attributes.

In some embodiments, the system 505 comprises a commercial estimator module 550 that is configured to estimate a commercial impact to the entity for a simulated security failure (e.g., a cyber attack, a privacy incident). Thus, the system 505 can execute theoretical or simulated security failures against a cyber profile of an entity. In one example, the cyber profile for an entity is determined from the various sophistication and motivation elements determined for the entity. The commercial estimator module 550 then calculates the effect of, for example, a distributed denial of service attack (DDoS) on the entity. To be sure, the simulated cyber attack in this example tests the sophistication of the entity and is affected by the motivation regarding the entity. The economic impact can include an economic impact to the entity itself, other entities that depend upon the entity, or combinations thereof. For example, a cyber security failure for a commercial institution, such as a DDoS attack, can cause direct economic impact on the institution from website downtime. The cyber security failure can also cause a commercial impact to the customers of the commercial institution if social security numbers, account numbers, or other sensitive consumer and/or personal information is stolen.

Additionally, implementing the recommendations, provided by the cyber risk management service for example, may be paired with changes to the policy criteria of a policy. For example, implementation of certain recommendations may be paired with automatic renewal, a consequent lower (or higher or otherwise changed) cyber risk policy premium, better coverage limits, better term length, future valuation and the like. For example, the change to the policy criteria of the policy may be implemented after the end of the term (e.g., 1, 3, 6 or 12 months, or any other appropriate term) of the current policy, or may trigger a renewal option at the lower premium rate immediately or on an accelerated basis. In this manner, a cooperative and constructive relationship may be achieved between insurers and insured-entities, thereby creating a positive feedback loop of improved cyber preparedness and lower/higher/changed premiums. As discussed previously, implementation of recommendations provided by the cyber risk management service may cause a change in any element of the policy criteria of a cyber policy. For example, if the sophistication of the entity is low, a higher deductible may be required, and vice versa. Additionally or alternatively, the type of coverage, a pricing or re-pricing, the amount of limits, an automatic renewal, and/or a renewal commitment, may change based on an increase or decrease in sophistication of the entity, and/or an increase or decrease in motivation of an attacker of the entity. Additionally, as recommendations are implemented, or other changes in the entity or the entity's situation, the motivation and sophistication, or other metrics, may change, and consequently a new analysis may be provided including new and/or changed recommendations for the entity.

Additionally or alternatively, the policy criteria of the policy itself may determine and/or change the weighting used in the system 505. In still further embodiments, a policy may affect the system 505 in other ways. In other words, the policy criteria of a policy may impact an assessment of a cyber risk, and/or an assessment service. For example, if a policy has a high deductible, the assessment service may not assess a motivation to initiate a security event. Various other options for having the policy criteria of a policy drive the type of assessment conducted are also possible.

The cyber risk management service as provided herein may include subjective evaluations, and may include vulnerability assessments, penetration testing, tabletop exercises, people services, risk engineering, and/or training exercises. Changes or renewed evaluations of any of these assessments may cause an increase or decrease in a sophistication of the entity, an increase or decrease in a motivation of an attacker of the entity, and/or a change in any other metric used to evaluate an entity. Any of these changes based on a new or revised assessment may cause a remediation service and/or a new or additional assessment service, to be implemented. Trends, averages and/or changes to an assessment or evaluation may impact policy criteria of a cyber security policy, as discussed herein.

Figure 5:
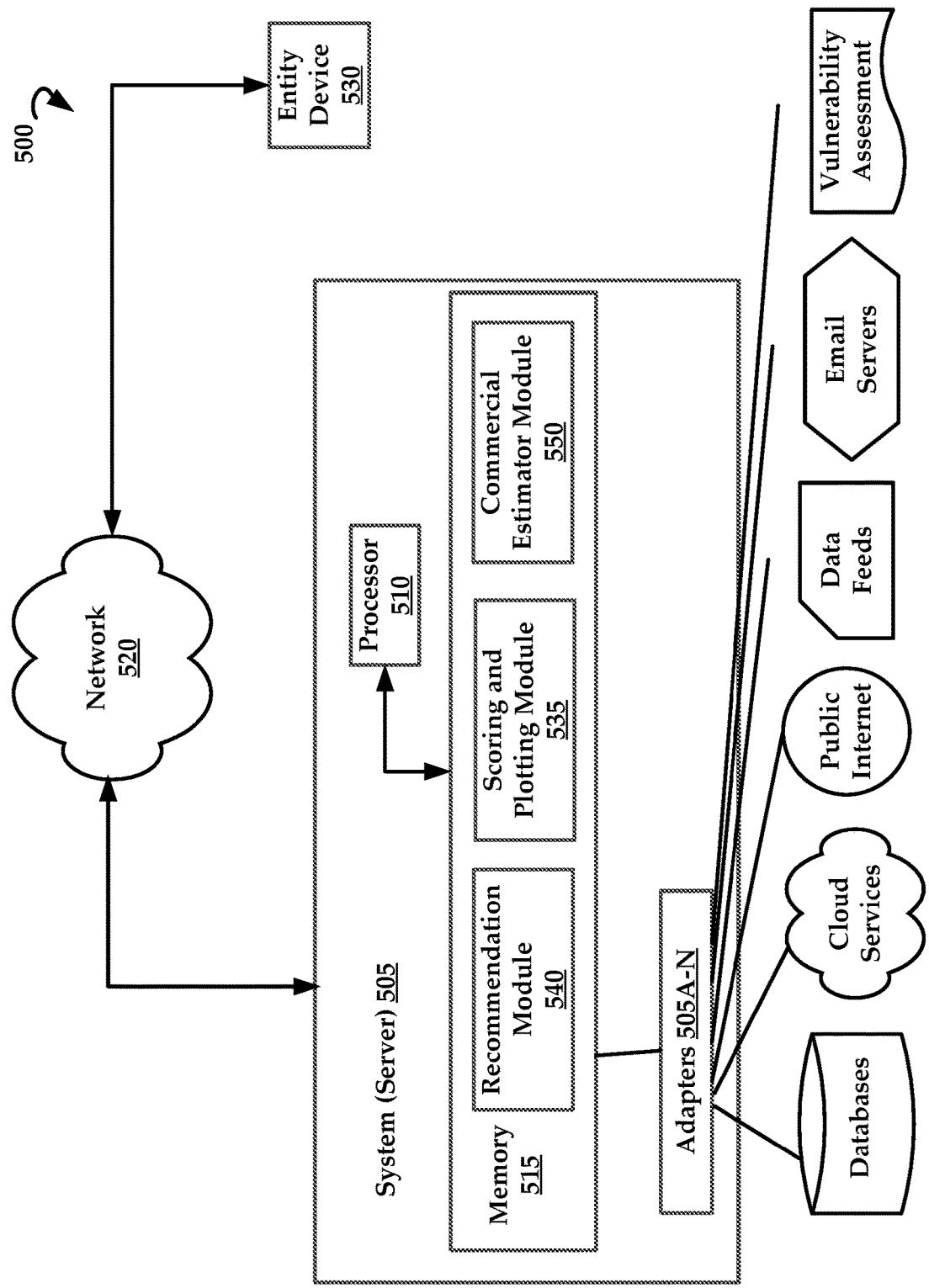
FIG. 5 is a block diagram illustrating a device according to an example embodiment.
Figure 6:
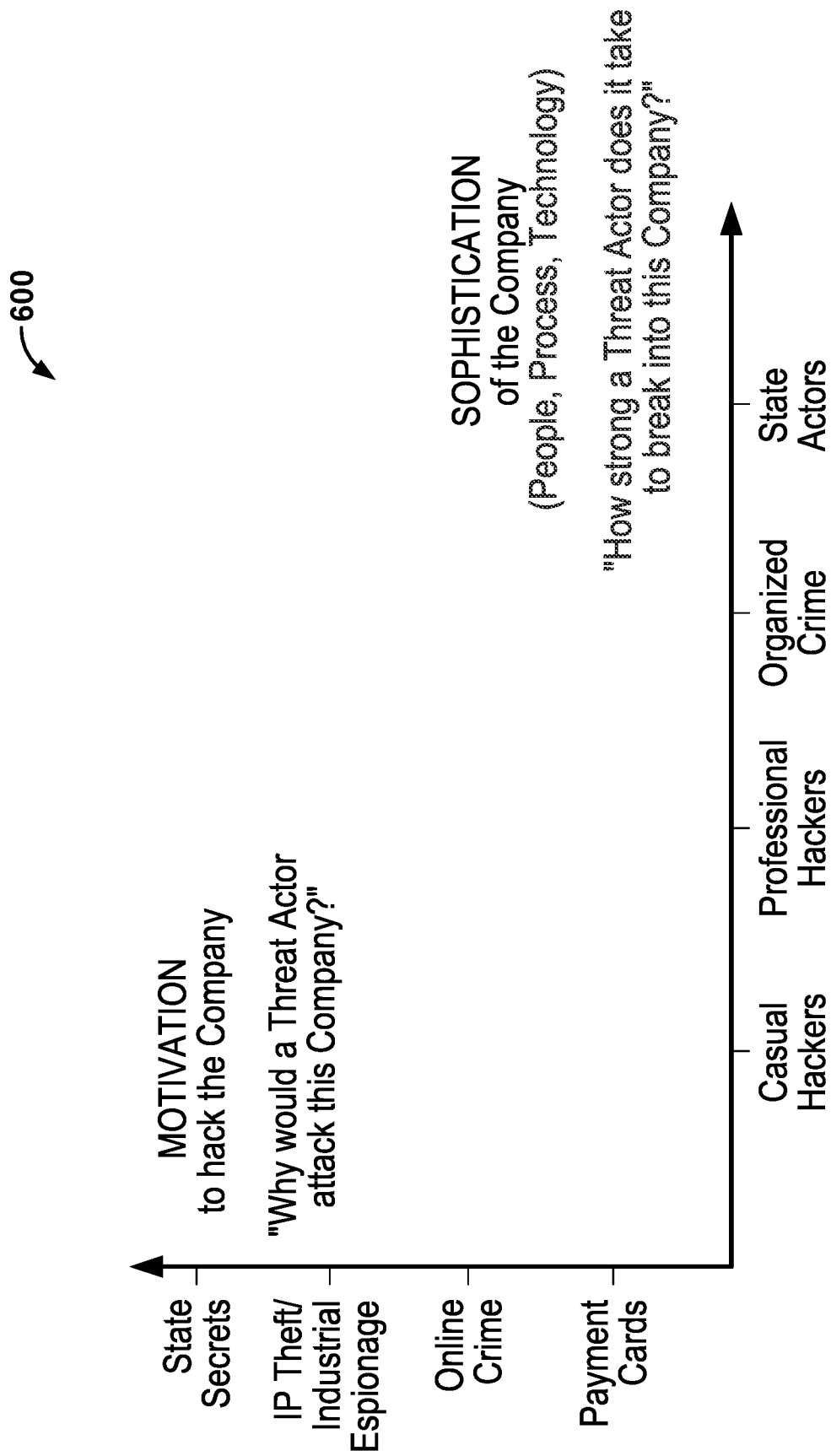
FIG. 6 is an example graphical user interface (GUI) that comprises a graphical representation that plots an entity's motivation and sophistication relative to cyber risk.

Various embodiments of the present technology can be practiced with a local computer system, and/or a cloud-based system. FIG. 5 is a high level schematic diagram of a computing architecture (hereinafter architecture 500) of the present technology. The architecture 500 comprises a system 505, which in some embodiments comprises a server or cloud-based computing device configured specifically to perform the diversity analyses described herein. That is, the system 505 is a particular purpose computing device that is specifically designed and programmed (e.g., configured or adapted) to perform any of the methods described herein. The system 505 can be coupled with entity device 530 using a network 520.

In one embodiment, the system 505 comprises a processor 510 and memory 515 for storing instructions. The memory 515 can include a recommendation module 540. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The system 505 may gather variables for an entity by querying the entity for information, collecting information from available online sources such as websites, corporate filings, news sources, other public record databases, and other resources. Additionally, data may be gathered from the entity's network using devices already present there or by placing a new device on the entity's network to gather more data. The data collecting device may be a server, router, firewall, switch, or repeater, or may be a software agent or routine that monitors traffic and/or performs packet inspection. The data collecting device may be on the company's network and/or its periphery, and may collect and/or analyze the data, while also transmitting it to system 505. In this manner, additional, proprietary data may be gleaned from a particular entity's network. The variables or a subset of the variables can be compared. The comparison can be for all or only a subset of all entities. The subset of variables can be selected by the end user, as well as the entities analyzed.

In some embodiments, the system 505 provides interfaces or adapters 505A-N that allow various resources to communicatively couple with the system 505. As an example, the system 505 can use an application program interface (API) or other communication interface. FIG. 5 illustrates example resources that can couple with the system 505. The system 505 can interrogate, for example, various databases such as corporate filings, news sources, and other public record databases. In another example, cloud services such as cloud storage and cloud computing environments. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources. The cloud may be formed, for example, by a network of servers with each server (or at least a plurality thereof) providing processor and/or storage resources. These servers may manage workloads provided by multiple users (e.g., cloud resource customers or other users). Typically, each user may place workload demands upon the cloud that vary in real-time, sometimes dramatically. The nature and extent of these variations typically depend on the type of business associated with the user.

The system 505 may also couple with the Internet as well as data feeds such as RSS feeds or social networks. Email behaviors can also be identified by interrogating email servers or email repositories.

In some embodiments, the system 505 can use vulnerability assessments generated by the entity or a third party, such as a cyber-security firm.

In contrast with a vulnerability assessment, which is more technical in nature, the present technology can also consider non-technical or semi-technical aspects of an entity and how these elements impact the cyber vulnerability of the entity. For example, non-technical elements include, but are not limited to, company size, revenue, company location, company industry sector, as well as other elements which are described herein. The present technology provides benefits above and beyond a typical vulnerability assessment, providing users with a robust and comprehensive view of a company's (or multiple companies') overall cyber security risk.

In some embodiments, the system 505 can obtain sophistication information about entities from the following non-limiting list of sources or resources: (a) Framework; (b) Hosting/infrastructure; (c) Account management; (d) Authentication; (e) Authorization; (f) System vulnerability; (g) Ad/Partner integration; (h) Files/Directories/Links; and (i) Patching.

In some embodiments, the system 505 can obtain sophistication information about entities from the following non-limiting list of sources or resources: (a) Customer Reviews; (b) Employee reviews; (c) Traffic statistics; (d) Business events/news; (e) Corporate connections; (f) Business type; (g) Customer data; (h) Brand/Revenue; (i) Employee profiles; (j) Social Media/Blogs; (k) Industry/Products; (l) Data Types; and (m) Company/Subsidiary connections.

For purposes of context, facets or features relating the motivation regarding a security failure (e.g., motivation of some actor, such as a hacker, to attack an entity, to expose sensitive information, to name a few) as well as the sophistication of the entity in preventing or dealing with a cyber security event will be referred to herein as an element. Thus, there can be a plurality of types of sophistication elements and a plurality of types of motivation elements. The actor may be a hacker, employee, another entity, to name a few.

Examples of motivation elements include: visibility; value; hacker sentiment; employee sentiment; company sentiment; customer sentiment, and combinations thereof—just to name a few. Each of these motivation elements may be further subcategorized as follows. Visibility may include information and/or derived measures related to the traffic, usage, and activity related to an entity, including but not limited to the in-links; pageviews; duration; traffic; links; page rank; market value; daily (stock) trade volume; exporting/importing; and combinations thereof—just to name a few. Value includes: revenue; net income; total assets; employees; and combinations thereof—just to name a few. Hacker sentiment includes: emails; credit cards; foreign languages; etc., which can be gathered from hacker forums and/or discussion groups, chat rooms, dark web, or dark net forums, such as the Tor Network, Internet Relay Chat (IRC), and combinations thereof—just to name a few. Employee sentiment includes: career opportunities; work/life balance; compensation; and combinations thereof—just to name a few. Company sentiment includes: senior leadership ratings; overall company ratings; recommendations; etc. Customer sentiment includes: product ratings; service ratings, and combinations thereof—just to name a few.

The present technology determines a level of sophistication of the entity. Sophistication may be considered a measure of People, Process, and Technology. People indicates how security-aware the entities' employees, principals and/or members are. In particular, do the people associated with the entity understand the risks, are they competent in security, and combinations thereof. Process indicates whether procedures and/or policies have clear and enforceable terms, and clearly indicate what to do in case of various events, including attacks. Process also indicates whether training is provided to employees, third party contractors and/or service providers, indicates their level of expertise, and combinations thereof.

Examples of sophistication elements include: hosting infrastructure; topology; vulnerability research; people; and combinations thereof—just to name a few. Hosting infrastructure includes; content distribution networks; shared hosting; cloud providers; etc. Topology includes: accessibility points; page layout; content on site; etc. Vulnerability research includes: CVEs (common vulnerabilities and exposures); patching; updating; default passwords; etc. People includes: chief information security officer (CISO); security team; skills; job postings; etc. In this manner, sophistication encompasses more than just vulnerability, and additionally includes people and processes that may impact a defensive posture of an entity.

Determining these variables may be a data gathering operation, which may be based on public information or a company's own data networks, as discussed herein. A cyber risk assessment, for instance a two by two (or higher order) graph, may be output, along with a composite score, a peer rank, an estimated commercial impact, and recommendations to decrease the cyber risk. These may all be output for each company assessed. All of these elements may be updated over time and in response to implementation of recommendations, thus, transforming the original data via the use of a particular computer.

In some embodiments, the system 505 is configured to evaluate each data point with respect to history, lineage, provenance (e.g., origin), source, time, entities and other details. The system 505 can then cleanse and standardize the data points. Examples of cleansing and standardizing using data normalization are described in greater detail below.

In some embodiments, the system 505 can use a canonical representation of the data points. As mentioned above, the system 505 can track entities and their attributes/elements over time. The system 505 is also configured to process rollups (e.g., summarizing the data along a dimension), aggregations, transforms, reductions, normalizations, deltas, as well as other types of data transformation or conversion processes that can also be used to convert the motivation/sophistication/combination elements into scores.

The system 505 then generates module-ready data for use with matrices of elements (motivation/sophistication) for one or more entities. In some embodiments, the system 505 then executes one or more models to generate scores, results, recommendations, delta values (changes in scores over time), as well as historical tracking of scores.

In some embodiments, the system 505 comprises a scoring and plotting module 535 that is generally configured to calculate sophistication scores, motivation scores, and combination scores; apply weighting to sophistication and/or motivation elements in various calculations; compare scores to threshold values; benchmark various scores over time; as well as other features described herein.

In a second set of functions, the scoring and plotting module 535 can create visual representations such as the graphs illustrated in FIGS. 6-12.

In one embodiment, the scoring and plotting module 535 is configured to calculate various scores for an entity. In another embodiment the scoring and plotting module 535 can calculate various scores for a plurality of entities. Again, these various scores can be calculated over time and utilized for benchmarking cyber security performance for an entity, or a group of entities that possess a particular attribute in common. For example, the scoring and plotting module 535 can calculate scores for groups of entities in an industry group, a geographical location, a company size, a technology sector, and so forth.

In an example calculation, the scoring and plotting module 535 is configured to calculate a motivation score for one or more entities. The scoring and plotting module 535 obtains motivation elements collected from the various resources and converts this information into a mathematical representation. In one embodiment, a motivation element of pageviews can be mathematically represented by comparing the pageviews of the entity to a set of thresholds. For context, the pageviews could be a pageview of a particular webpage or set of webpages. To be sure, the higher profile and more visited a website is, the more likely that it will be attractive to a hacker, especially if other motivation factors are present such as the entity being involved in commercial activities, just for example.

For purposes of obtaining a coherent scoring scheme, the scoring and plotting module 535 may normalize various elements to obtain mathematical values that are usable in an algorithm for scoring motivation or sophistication. By way of example, each of the set of thresholds is associated with a mathematical value. If the entity has pageviews in excess of 10,000 unique users in one day, the entity is given a score of five. If the entity has pageviews in excess of 100,000 unique users in one day, the entity is given a score of ten. If the entity has pageviews in excess of 200,000 unique users in one day, the entity is given a score of fifteen. Again, these are merely examples of possible ways to convert pageviews into a mathematical representation that can be combined with other mathematical representations of other motivation elements in order to create an overall motivation score.

In other examples, an employee sentiment can be represented mathematically as a percentage of positive versus negative comments from employees. In another example, negative employee behaviors, actions, or statements can be counted over time and compared to thresholds (in a method similar to that above with respect to pageviews).

Each of the motivation elements (if necessary) is converted into a mathematical representation. The ultimate motivation score can be calculated by taking a sum of each mathematical representation of motivation elements. In some embodiments, the motivation score can be a representation of one or a combination of many motivation elements.

In some embodiments, the system 505 can be configured to weight one or more of the elements in a score calculation. For example, if it is determined that certain elements are more likely to increase the likelihood of a security failure (e.g., a cyber attack, a privacy incident), these elements can be assigned a weight. In an example, the weight is applied by multiplying a mathematical representation of an element by a coefficient or factor. If an element value for pageviews is five, a weighting could include multiplying this number by a coefficient of 0.5, which reduces the impact of that value on the overall score. Increases in element values can also be achieved.

While the above examples reference motivation elements, the scoring and plotting module 535 is also configured to process sophistication elements to obtain sophistication scores. The exact details for converting sophistication/motivation elements into mathematical representations will vary according to the type of information included in the elements. To be sure, some types of elements such as pageviews and revenue are inherently more mathematical in their quantities, while other elements are more non-mathematical in nature such as employee or customer sentiment. For non-mathematical elements, users can develop suitable schemes or algorithms for converting or quantifying these elements into mathematical form.

According to some embodiments, the scoring and plotting module 535 can determine various facets of an entity or group of entities by comparing the motivation, sophistication, and/or combined scores of these entities. Answers to pertinent questions can be deduced or inferred from the comparison.

For example, in one embodiment, the scoring and plotting module 535 is configured to determine a position of an entity within an aggregate risk score of a portfolio of entities. Thus, the scoring and plotting module 535 has been used to calculate an aggregate risk score (motivation, sophistication, and/or combined) for numerous entities. In one embodiment, the scoring and plotting module 535 selects a plurality of motivation elements and analyzes these elements for each of a portfolio (plurality) of entities using the above examples as a guide for calculating motivation scores. In some embodiments, the same motivation elements are used for each entity.

The scoring and plotting module 535 can then determine where the entity lies within the group of scores. For example, out of 30 entities, a subject entity places 25th out of thirty.

The scoring and plotting module 535 can also be utilized to generate graphs and GUIs that display various scores in graphical format(s). For example, in FIG. 6, a graph with two axes is illustrated. The graph 600 comprises a vertical axis that is representative of motivation elements, and the horizontal axis is representative of sophistication elements. Indeed, this graph can be used to display information about a single entity or a plurality of entities.

In one embodiment, the motivation axis is delineated or stratified based on the type of content. Less important types of secure information are located towards the bottom of the axis, whereas more important types of information are located at the top part of the axis. In this embodiment, the lower part of the motivation axis references payment cards (e.g., credit cards) and other types of general consumer information. Above that is online crime such as phishing, malware, and other malicious behavior. Above online crime is IP theft and industrial espionage. At the top of the motivation axis are state secrets. To be sure, other categories of information types will lie somewhere along this axis, if not specifically mentioned. Furthermore, the axis can be defined by other types of information points. For example, an entity can structure their motivation axis to include information that they deal with, structured from least important to most important.

In the sophistication axis, which is the horizontal axis, hacker profiles are listed from left to right on the axis from a lowest impact actor type to a highest impact actor type. For example, actor types can include casual hackers, professional hackers, organized crime, and state actors. Each of these actor types has a different threat level associated therewith. The sophistication axis represents the strength or threat level that it takes to successfully hack the subject entity/entities.

Figure 7:
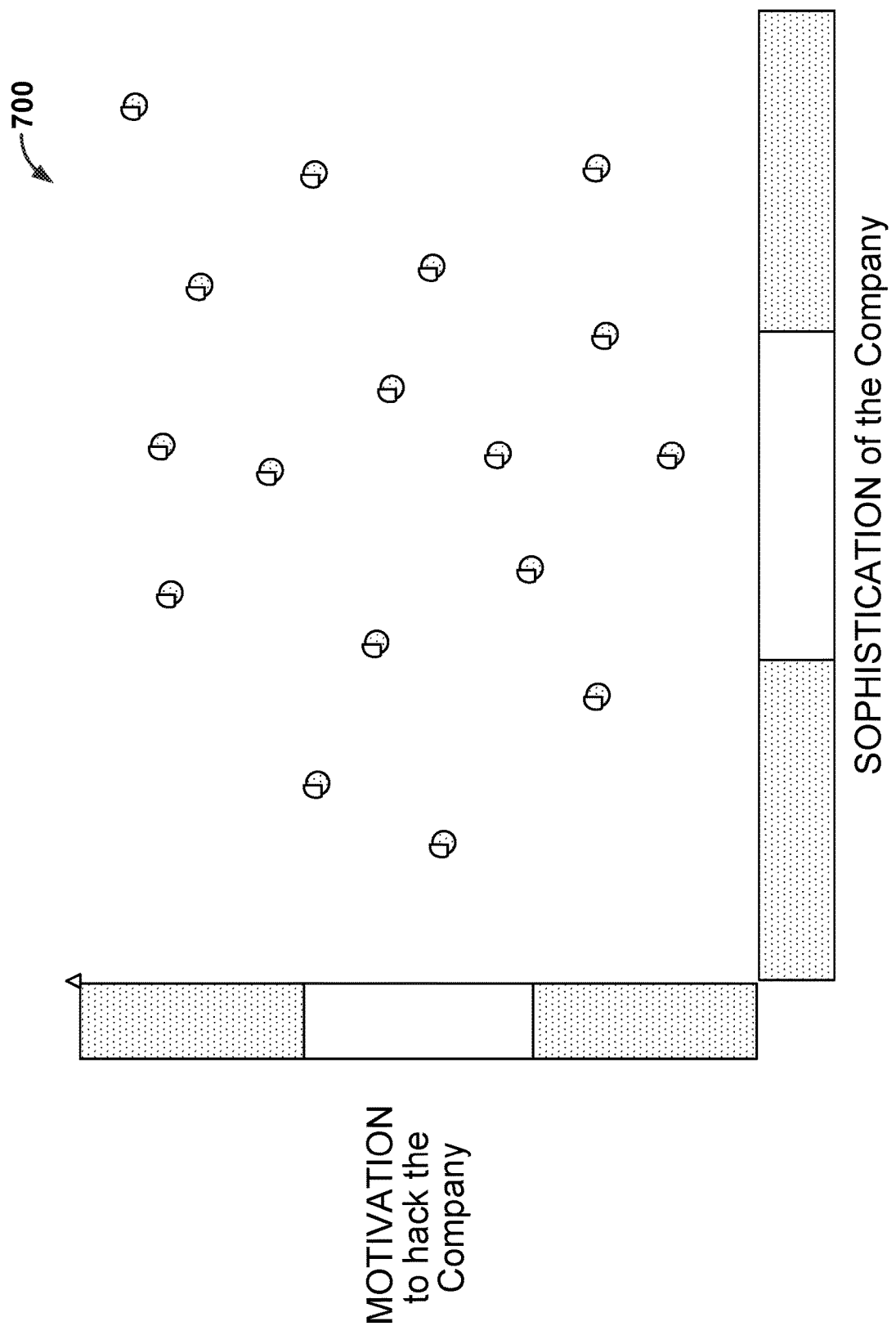
FIG. 7 is an example graphical user interface (GUI) that comprises a scatter plot illustrating an entity's motivation and sophistication relative to cyber risk.

FIG. 7 is an example graphical user interface (GUI) that comprises scatter plot illustrating an entity's motivation and sophistication relative to cyber risk. The scatter plot 700 comprises a vertical motivation axis and a horizontal sophistication axis. Each of the points plotted on the scatter plot 700 represent an entity. Again, these entities can be analyzed together because they are a part of an entity group (e.g., industry group, same geographical location, same company size, etc.).

Figure 8:
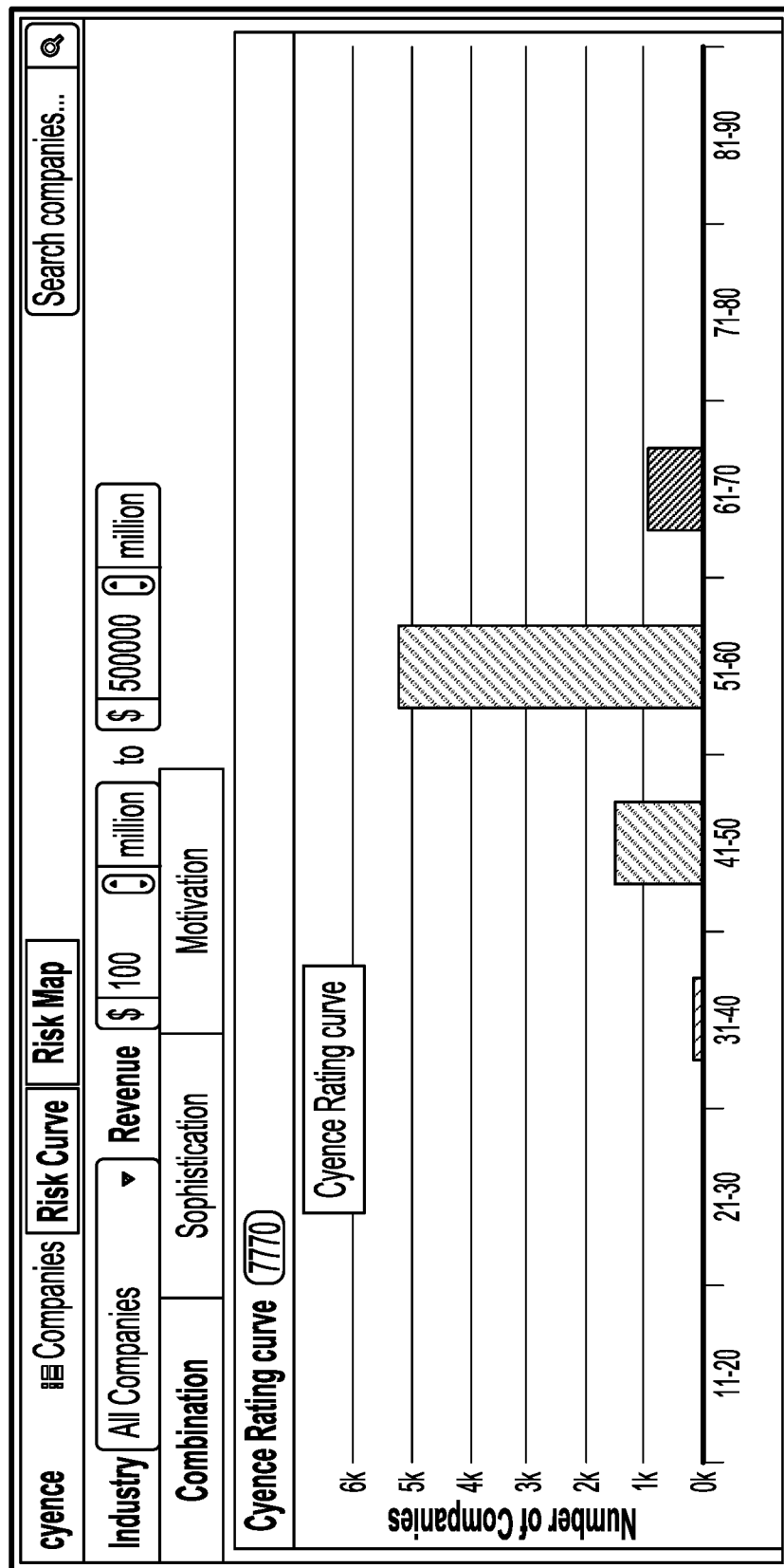
FIG. 8 is an example graphical user interface (GUI) that comprises a bar graph illustrating the plotting of a plurality of entities based on their combination scores.

FIG. 8 is an example graphical user interface (GUI) that comprises a bar graph illustrating the plotting of a plurality of entities based on their combination scores. The bar graph 800 comprises a vertical axis that represents a number of companies and a horizontal axis that represents combination scores for a set of entities. For example, most entities in the group have combination scores (sophistication and motivation) that fall within a score range of 51-60. Other groups of entities fall within other score ranges.

To be sure the system 505 can cause an elemental analysis of these similar scoring groups to identify what elements are shared between the entities, what elements are different, and so forth. Thus, the graphing of entities based on scores aids the system 505 in identifying groups of entities that require attention. For example, the entities in the score range of 31-40 are severely underperforming.

Figure 9:
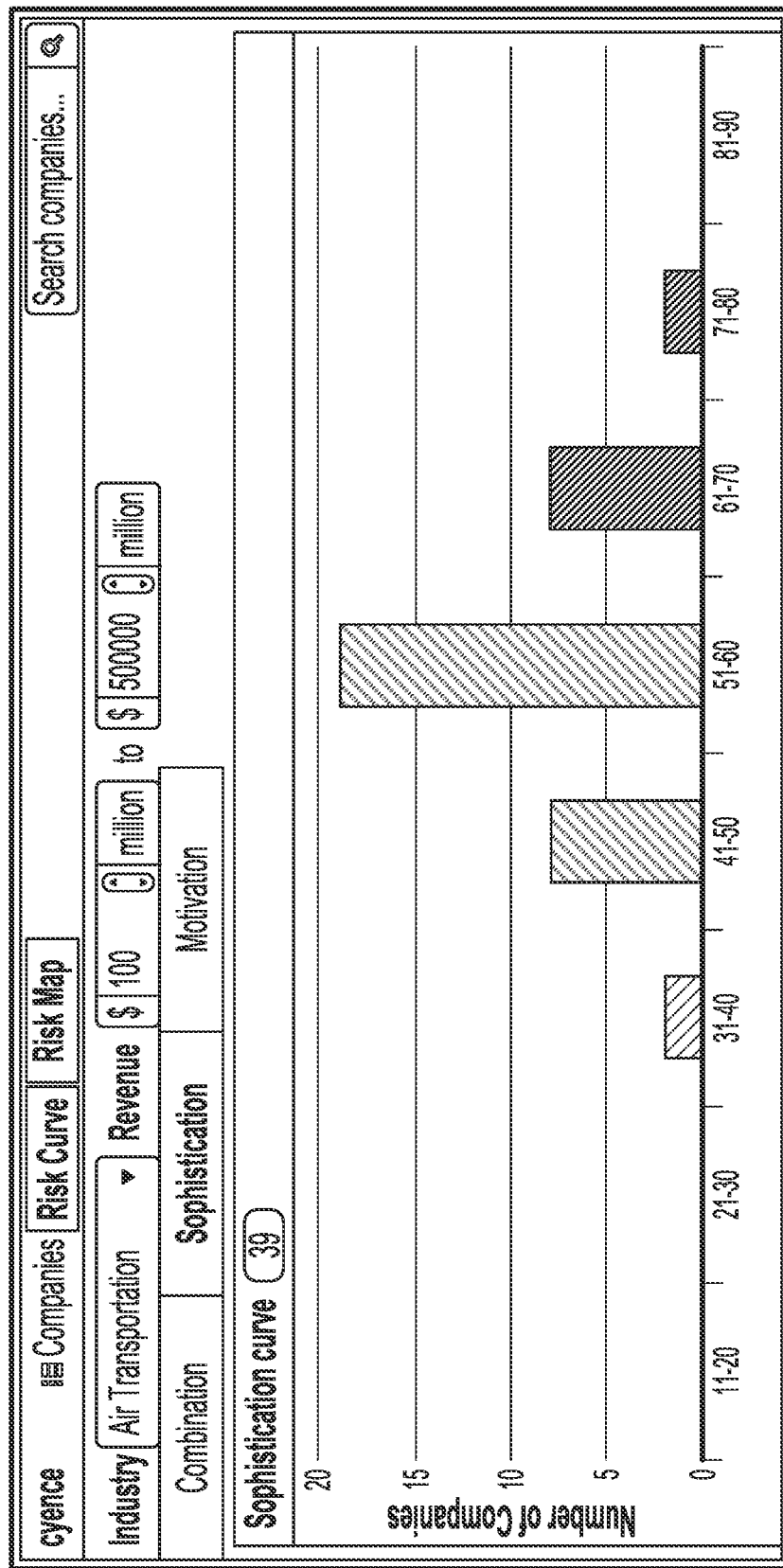
FIG. 9 is an example graphical user interface (GUI) that comprises a bar graph illustrating the plotting of a plurality of entities based on their sophistication scores.

FIG. 9 is an example graphical user interface (GUI) that comprises a bar graph illustrating the plotting of a plurality of entities based on their sophistication scores. The bar graph 900 comprises a vertical axis that represents a number of companies and a horizontal axis that represents sophistication scores for a set of entities.

Figure 10:
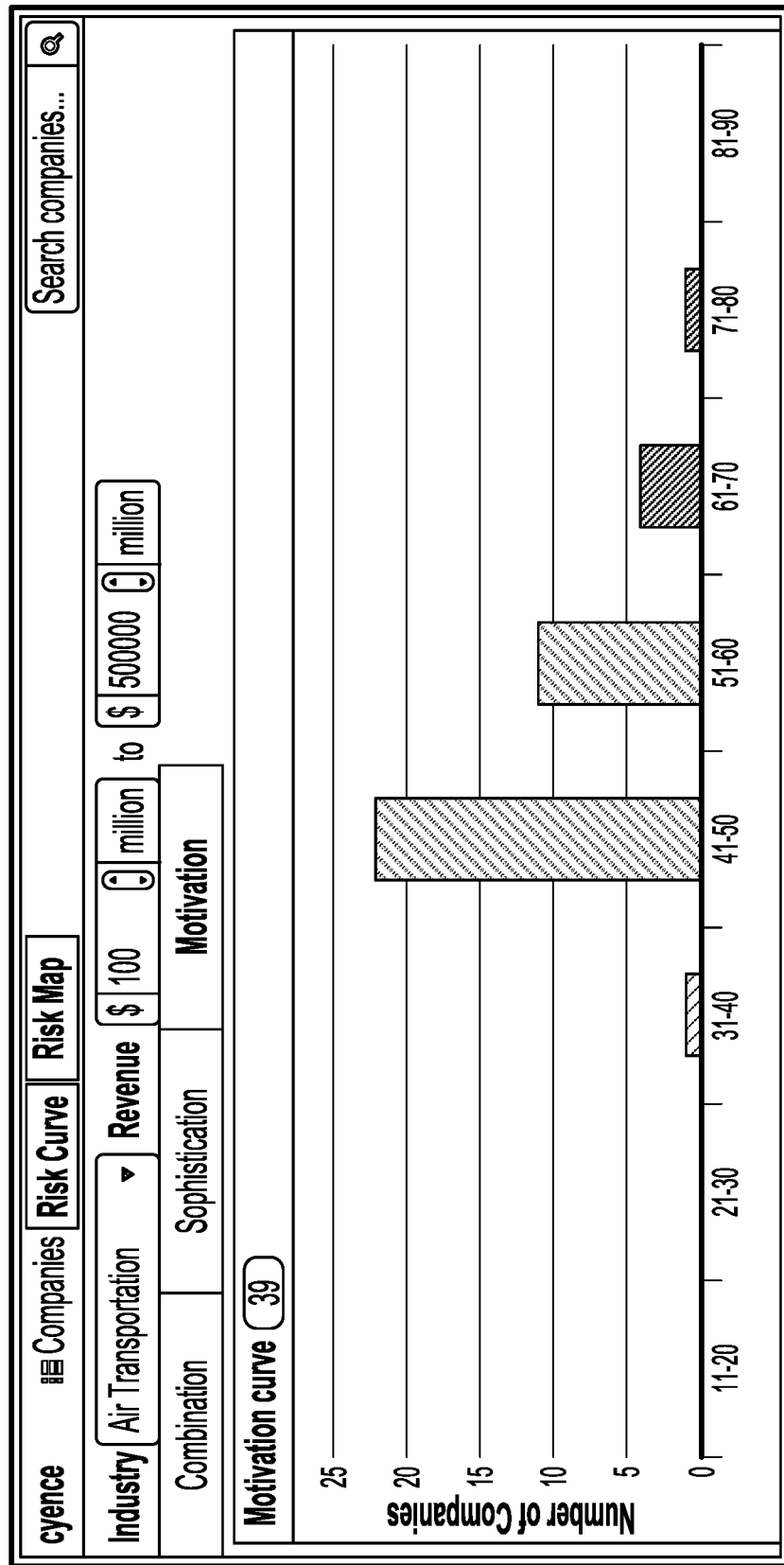
FIG. 10 is an example graphical user interface (GUI) that comprises a bar graph illustrating the plotting of a plurality of entities based on their motivation scores.

FIG. 10 is an example graphical user interface (GUI) that comprises a bar graph illustrating the plotting of a plurality of entities based on their motivation scores. The bar graph 1000 comprises a vertical axis that represents a number of companies and a horizontal axis that represents motivation scores for a set of entities.

By comparing these graphs illustrated in FIGS. 8-10, underperformance in sophistication and/or motivation can be quickly and easily determined, at least on a high level. Again, a more granular element analysis can be conducted when groups with underperforming sophistication/motivation scores are identified.

Figure 11:
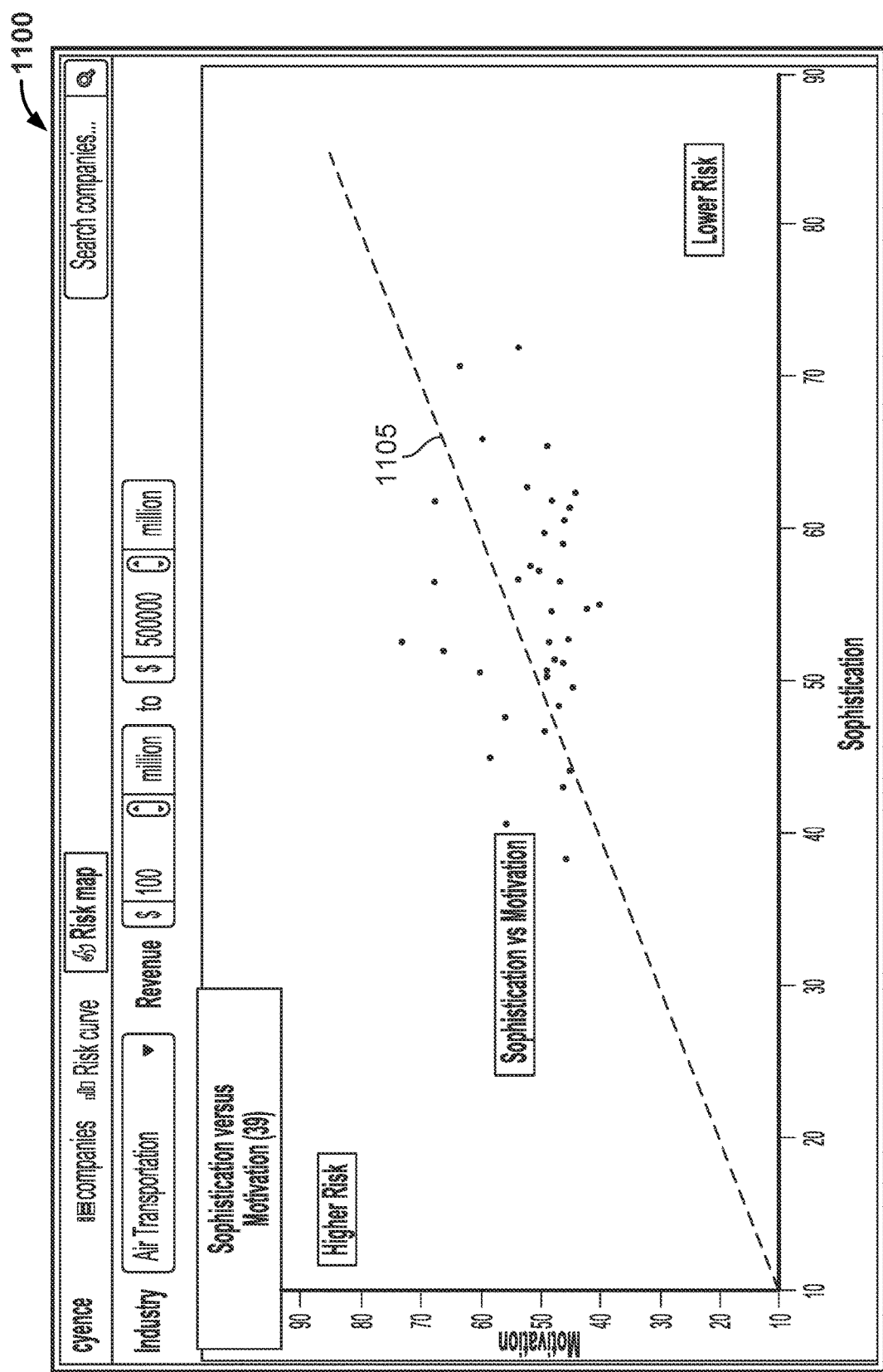
FIG. 11 is an example graphical user interface (GUI) that comprises a scatter plot that represents a plurality of entities plotted according to their combination score.

FIG. 11 is an example graphical user interface (GUI) that comprises a scatter plot that represents a plurality of entities plotted according to their combination score. The scatter plot 1100 includes a plurality of data points that each represents an entity. The scatter plot 1100 comprises a vertical axis that represents motivation and a horizontal axis that represents sophistication scores for a set of entities. The higher risk area on the plot is where the motivation to hack is high and the sophistication of the entity is low.

The system 505 can create a line 1105 of acceptable motivation/sophistication scores. Companies falling below this line 1105 have a suitable cyber risk profile, whereas companies above the line have an unsuitable cyber risk profile. These companies can be identified and analyzed in order to suggest recommendations for improving their cyber risk.

FIG. 12 is an example graphical user interface (GUI) 1200 that comprises a scatter plot that represents a plurality of entities plotted according to their combination score, as well as additional graphical representations for an entity and a list of recommendations based on the plotting. The scatter plot includes a line 1205 of acceptable motivation/sophistication scores.

The plot is similar to that of FIG. 11, with the addition of two graphical representations. For example, a linear slide 1220 displays the position of an entity within a peer group of entities. This same relationship position is illustrated in a gauge graph 1210.

In response to making a cyber risk assessment, the recommendation module 540 can be executed to provide the end user (or entity) with some type of actionable feedback. For example, the recommendation module 540 can provide the end user one or more actions to the end user based on the diversity score and the clusters of similar variables. This is described in further detail above. These one or more actions potentially decrease the cyber risk of the entity. In one example, the recommendation module 540 can automatically identify variables, which if changed, would affect the cyber risk assessment. In further exemplary embodiments, entities may agree to automatic implementation of recommendations in exchange for lower policy premiums.

As best illustrated in FIG. 12, a set of recommendations 1215 is provided along with the graphical analysis generated for the entity. Again, these recommendations are based on the system 505 having knowledge of the motivation elements, sophistication elements, as well as the scores calculated not only for the entity, but other entities (in some embodiments).

Exemplary methods and systems according to the present technology may also provide benchmarking over time. In this manner, the system 505 can track, for a company or group or entities, cyber risk over a selectable time period, for example, days, weeks, months, and/or years. This benchmarking may be against a dynamic or static evaluation of the peer group, for instance, an entity's past and present cyber risk tracked against a static past peer group, static present peer group, and/or dynamic peer group. The present technology provides information related to the updated information (the new motivation score, the new sophistication score, the new composite score, etc.), including differences (the amount of the change made in one or more updates, namely the delta), and trends (patterns over many time steps).

Figure 13:
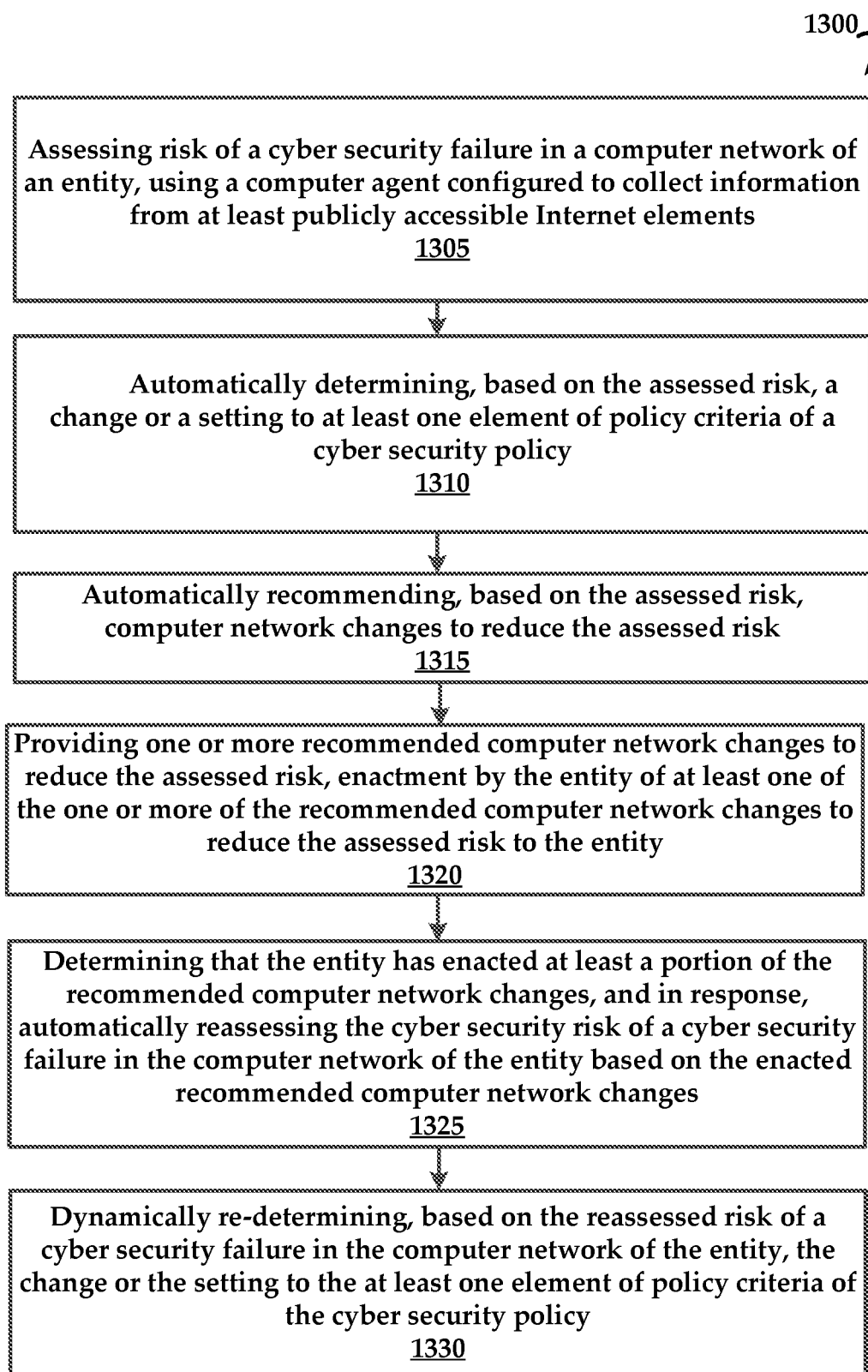
FIG. 13 is a flowchart of an example method of the present technology.

FIG. 13 is a flowchart of an example method 1300 of the present technology. The method 1300 includes the system 505 assessing 1305 risk of a cyber security failure in a computer network of an entity, using a computer agent configured to collect information from at least publicly accessible Internet elements. The cyber risk includes a security failure (e.g., a cyber attack, a privacy incident) of the entity.

The system 505 may query the entity for information, collect information from available online sources such as websites, corporate filings, news sources, other public record databases, and other resources. Additionally, data may be gathered from the entity's network using devices already present there or by placing a new data collecting device on the entity's network to gather more data. The data collecting device may be on the company's network and/or its periphery, and may collect and/or analyze the data, while also transmitting it to the system 505. In this example, additional, proprietary data may be gleaned from a particular entity's network.

The exemplary method 1300 also includes the system 505 automatically determining 1310, based on the assessed risk, a change or a setting to at least one element of policy criteria of a cyber security policy. In some embodiments, the at least one element of policy criteria involves a term or condition of a cyber policy. In one embodiment, the cyber security policy includes a cyber security insurance policy.

Next, in this example, the method 1300 includes the system 505 automatically recommending 1315, based on the assessed risk, computer network changes to reduce the assessed risk Next, in this example, the method 1300 includes the system 505 providing 1320 one or more recommended computer network changes to reduce the assessed risk, enactment by the entity of at least one of the one or more of the recommended computer network changes to reduce the assessed risk to the entity.

The exemplary method 1300 also includes the system 505 determining 1325 that the entity has enacted at least a portion of the recommended computer network changes, and in response, automatically reassessing the cyber security risk of a cyber security failure in the computer network of the entity based on the enacted recommended computer network changes.

Next, the exemplary method 1300 includes the system 505 dynamically re-determining 1330, based on the reassessed risk of a cyber security failure in the computer network of the entity, the change or the setting to the at least one element of policy criteria of the cyber security policy.

FIG. 14 is a flowchart of an example method 1400. The method 1400 includes the system 505, based on the assessing of risk of the cyber security failure in the computer network of the entity, plotting 1405 one or more features of the entity and other members of a peer group of the entity, the plotting being configured to visually illustrate the risk of a cyber security failure in the computer network of the entity; and the automatically recommending of computer network changes being based on the plotting.

Next, the method 1400 includes the system 505, in response to the determining that the entity has enacted at least a portion of the recommended computer network changes, initiating 1410 the change or the setting to the at least one element of policy criteria of the cyber security policy.

Next, the method 1400 for the assessing of risk of the cyber security failure in the computer network of the entity includes the system 505, using 1415 a plurality of sophistication elements for the entity, a sophistication for the entity with respect to preventing the cyber security failure, the sophistication being one of features of the entity. Again, the sophistication relates to people, processes, and technology. The sophistication analysis as a whole attempts to quantify how strong a threat actor would be required to execute a successful security failure of the entity.

Next, the method 1400 for the assessing of risk of the cyber security failure in the computer network of the entity includes the system 505 assessing, using a plurality of motivation elements regarding the entity, a motivation of an actor to initiate the cyber security failure, the motivation being one of a plurality of features of the entity. In some embodiments motivation is a motivation of an actor (e.g., a hacker) to initiate a cyber security failure.

FIG. 15 is a flowchart of yet another example method 1500 for modifying a policy based on a cyber risk analysis. The method 1500 includes the system 505 assessing 1505, using a plurality of sophistication elements for the entity, a sophistication for the entity with respect to preventing the cyber security failure, the sophistication being one of a plurality of features of the entity; and assessing, using a plurality of motivation elements regarding the entity, a motivation of an actor to initiate the cyber security failure, the motivation being another one of the features of the entity. Again, the sophistication relates to people, processes, and technology. The sophistication analysis as a whole attempts to quantify how strong a threat actor would be required to cause a successful cyber failure.

Next, the method 1500 in various embodiments includes the system 505 calculating 1510 a composite score from a motivation score and a sophistication score, the motivation score representing the plurality of motivation elements, the sophistication score representing the plurality of sophistication elements.

To be sure, steps 1505 and 1510 include the collection of motivation and sophistication elements, converting these elements into mathematical representations (if needed), and processing these elements into scores using relevant algorithms.

In some embodiments, the method 1500 includes the system 505 creating 1515 an aggregate risk score of a portfolio of entities based on a plurality of motivation scores including the motivation score and a plurality of sophistication scores including the sophistication score; and benchmarking over time at least one of the sophistication score, the motivation score, the composite score, and the aggregate risk score.

Next, the method 1500 in some embodiments includes the system 505 identifying 1520 clusters of sophistication elements or motivation elements shared between two or more entities of the portfolio of entities, the clusters of sophistication elements or motivation elements being associated with an increase in risk of a cyber security failure in the computer network of the entity.

Next, the method 1500 in some instances includes the system 505 identifying 1525 additional sophistication elements or motivation elements for at least one of the two or more entities of the portfolio of entities that are not shared with the portfolio of entities, the additional sophistication elements or motivation elements being associated with another increase in the risk of a cyber security failure in the computer network of the entity; and generating recommendations for the at least one of the two or more entities of the portfolio of entities that will cause a decrease in the risk of a cyber security failure in the computer network of the entity.

According to some embodiments, the system 505 can be programmed with policy parameters. The system 505 can generate recommendations for the insurer based on the motivation and sophistication analysis of the entity. In some instances, the recommendation could be to deny a policy or terminate a policy if the entity has motivation or sophistication elements that are defined by the policy as being unacceptable or uninsurable.

According to some embodiments, the present disclosure can include systems and methods that utilize the vast array of information gathered by computer agents and provided by entities to discover circumstantial or indirect evidence about an entity that may affect the entity's assessed risk.

For context, data collected by the systems and methods of the present disclosure, such as system 505 (FIG. 5), may obtain a large amount of data (e.g., big data collection) that can include many types of data that directly reference, partially reference, or indirectly reference an entity. A direct reference is a reference to an entity that is confirmable, meaning that it is virtually certain that the entity is discussed or referenced by a particular data. An example would be a newspaper article.

A partial reference could include any data that mentions the entity, but references the entity in an incomplete manner. For example, an online review where the entity has been named, but the author did not spell the entity's name in an exact manner. Thus, the partial reference is a simple process to confirm whether the data is truly referencing the entity.

Data using an indirect reference may be more difficult to analyze. For example, a social media user may write a lengthy complaint about a particular entity, but the author may not want to name the entity directly. Through big data collection processes and circumstantial or indirect evidence analysis using cross referencing of the big data content, the system 505 can confirm that an entity is being referenced by the author. By way of example, suppose that the author is an employee of the entity and is writing a whistle blowing article about workplace behaviors of the entity. Using collected data, the system can cross reference the author's name and workplace with entity information stored in the system to determine or infer that the employee is describing their workplace.

As additional information and data are collected and stored by the system 505, the ability of the system 505 to cross reference data increases, which also increases the likelihood that circumstantial or indirect linkages will be determined and found useful for the diversity analyses described herein.

To be sure, these circumstantial evidentiary reviews may be utilized in risk assessment. If the circumstantial or indirect evidence is positive, the cyber risk may be decreased. Conversely, if the circumstantial or indirect evidence is negative, the cyber risk may be increased.

Also, in some embodiments, a relative strength of the cross referenced circumstantial or indirect evidence can be determine and utilized. For example, if the system cannot determine with certainty that the entity is implicated in the circumstantial or indirect evidence, or if the circumstantial or indirect evidence is negative or positive in nature, the system 505 can choose to ignore the circumstantial or indirect evidence within the diversity analysis or flag the entity for additional review.

Figure 16:
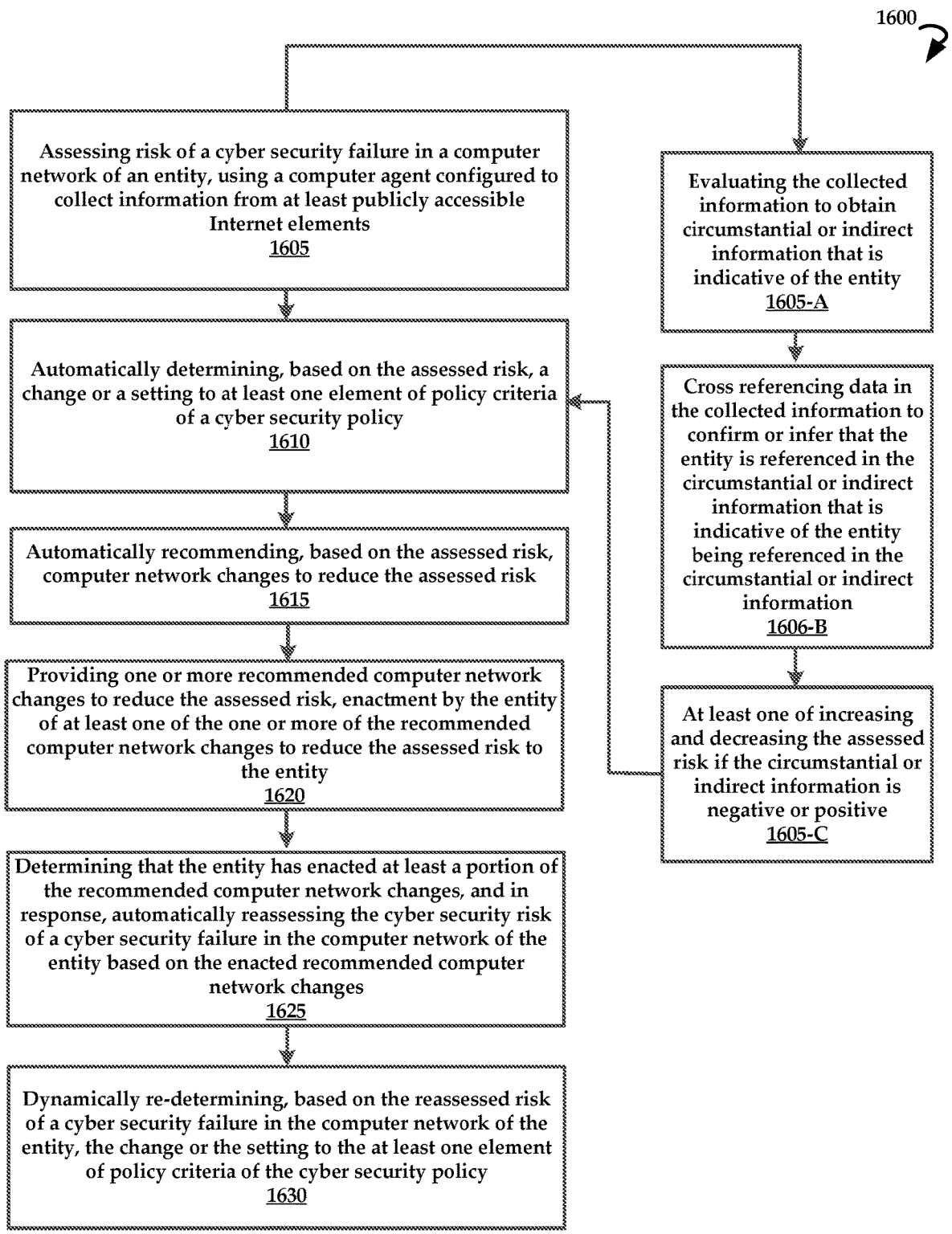
FIG. 16 is a flowchart an additional example method of the present disclosure.

FIG. 16 is a flowchart of an example method 1600 of the present disclosure. The method 1600 includes the system 505 assessing 1605 risk of a cyber security failure in a computer network of an entity, using a computer agent configured to collect information from at least publicly accessible Internet elements. The cyber risk includes a security failure (e.g., a cyber-attack, a privacy incident) of the entity.

The system 505 may query the entity for information, collect information from available online sources such as websites, corporate filings, news sources, other public record databases, and other resources. Additionally, data may be gathered from the entity's network using devices already present there or by placing a new data collecting device on the entity's network to gather more data. The data collecting device may be on the company's network and/or its periphery, and may collect and/or analyze the data, while also transmitting it to system 505. In this example, additional, proprietary data may be gleaned from a particular entity's network.

In various embodiments, a component of this review process includes a circumstantial or indirect data or information review for the entity. Thus, the method 1600 includes a sub-process that involves a step 1605-A of evaluating the collected information to obtain circumstantial or indirect information that is indicative of the entity. In one example, the process comprises searching the social media accounts of employees of the entity, as well as any other online resources linked to the employees. Another example includes searching trade journals or legal proceedings. In another example, the process utilizes data gathered during routine use of the system 505 in gathering data for direct cyber risk assessments and extracting circumstantial or indirect information therefrom.

Next, the sub-process comprises a step 1605-B of cross referencing data in the collected information to confirm or infer that the entity is referenced in the circumstantial or indirect information that is indicative of the entity being referenced in the circumstantial or indirect information.

The sub-process can also include a step 1605-C of at least one of increasing or decreasing the assessed risk if the circumstantial or indirect information is negative or positive.

Also, as mentioned above strength of the circumstantial or indirect analysis can be utilized in some embodiments. For example, if the circumstantial or indirect analysis does not conclude that the entity referenced in the circumstantial or indirect data is the entity of the subject cyber risk analysis, but that it is highly likely that the entity is correct, the system 505 can weigh the circumstantial or indirect analysis aspect of the risk analysis by 80 percent. If the entity is later determined to be correct through additional data gathering, a weight of the circumstantial or indirect analysis can be increased to 100 percent.

Thus, in some embodiments, the circumstantial or indirect analysis can be periodically executed to refine the cyber risk analyses of the present disclosure. In one embodiment, the circumstantial or indirect analysis is executed during re-assessment and/or re-determining periods described herein. In other embodiments, the circumstantial or indirect analysis is executed and/or re-executed at other intervals.

By way of example, if the risk analysis calculates a circumstantial score of seven for the entity (where scores fall in a range of zero to 10), and the system 505 has a certainty level of 80 percent, the score would be reduced to 5.6.

The exemplary method 1600 also includes the system 505 automatically determining 1610, based on the assessed risk, a change or a setting to at least one element of policy criteria of a cyber security policy. In some embodiments, the one or more elements of policy criteria involve a term or condition of a cyber policy. In one embodiment, the cyber policy includes a cyber security insurance policy.

Next, in this example, the method 1600 includes the system 505 automatically recommending 1615, based on the assessed risk, computer network changes to reduce the assessed risk.

Next, in some instances, the method 1600 includes the system 505 providing 1620 one or more recommended computer network changes to reduce the assessed risk, enactment by the entity of at least one of the one or more of the recommended computer network changes to reduce the assessed risk to the entity.

The exemplary method 1600 also includes the system 505 determining 1625 determining that the entity has enacted at least a portion of the recommended computer network changes, and in response, automatically reassessing the cyber security risk of a cyber security failure in the computer network of the entity based on the enacted recommended computer network changes.

Next, the exemplary method 1600 includes the system 505 dynamically re-determining 1630, based on the reassessed risk, the change or the setting to the at least one element of policy criteria of the cyber security policy.

According to some embodiments, the present disclosure provides for enhanced and improved gathering, analysis, and matching of entity data obtained from numerous resources, both public and private. This information can be gathered for each new entity that the system 505 desires to evaluate. In some embodiments, the information is evaluated and circumstantial or indirect evidence is analyzed to deduce an identity of an entity that is referenced (but not directly named) in the data.

To be sure, the evaluation process can be executed to gather information about numerous entities to enhance the inferential analyses described above. That is, the system 505 can periodically or continually search for new entities to increase a knowledge base that is used to compare against a target entity, and to improve the cyber risk policy or network of the target entity. These new entities can be found, for example, through online press releases or news stories, from trade publications, or from competitive information obtained from other entities.

As mentioned above, the system 505 gathers variables for an entity by querying the entity for information, collecting information from available online sources such as websites, corporate filings, news sources, other public record databases and resources. Additionally, data may be gathered from the entity's network using devices already present there or by placing a new device on the entity's network to gather more data. The data collecting device may be a server, router, firewall, switch, or repeater, or may be a software agent or routine that monitors traffic and/or performs packet inspection. Regardless of how the entity information is gathered, the system 505 can initially create a base set of data regarding the entity.

In some embodiments, the system 505 gathers information regardless of whether an entity can be directly identified in the information. This is referred to as circumstantial or indirect information. Thus, the system 505 is not required to gather data for a particular entity, but can gather general data about topics such as data breaches, vendor usage, and other information. This collected information can be matched to an entity existing in the database or a new entity can be identified.

A base set of data about the entity can be stored in a database. The base set of data can be obtained for any number of entities. As the database grows the predictive and inferential capabilities of the system 505 increase by using what is referred to as "big data."

As more data is gathered by the system 505 over time, the system 505 can execute matching algorithms to match gathered data to the entity information in the database to determine if the gathered information is already present in the database. If the gathered information about an entity is not in the database, the system 505 can store the information as a new base set of data for the entity.

For example, the system 505 may determine that this particular entity has not been encountered before as no matching information for the entity is found in the database. In response, the system 505 can create a new database record for the entity. Additional information can be gathered about this entity by the system 505 when the public and private resources are interrogated to determine more information about this newly discovered entity.

In addition to gathering information about new entities, the system 505 can operate to continually gather new information about entities existing in the database. That is, once the system 505 has encountered an entity and performed initial data gathering operations and/or direct and inferential analyses for the entity, the system 505 can periodically or continually search existing and new resources (if available) to incrementally improve the entity data over time. This periodic search for new information will discover new public and private entity information, which may affect prior or future inferential analyses for the entity. For example, when initially evaluated it was determined that an entity was using three specific cloud service providers as vendors. In a subsequent press release, it is discovered that the entity is now using a single cloud service provider. This information could indicate that a cyber risk has potentially increased for this entity due to a decrease in diversity.

Thus, an evolving and improving set of entity data that can change over time, according to various embodiments, is important to ensuring that any direct or indirect (circumstantial) analyses of the entity are current and accurate.

In some embodiments, the system 505 can execute searches for entity information across one or more social networks. Social networks provide a robust and rapidly evolving resource where entity information can be found. Thus, in addition to the many public and private entity resources described above, the system 505 can also collect entity information from social networks for inclusion in the knowledge base.

By way of example, a social network is searched and conversations regarding a possible data breach of an entity are discovered. This direct information can be used to assess an overall cyber risk for the entity. In another example, it is determined from a social media conversation that an entity has secured a new partnership with another entity to enhance their PCI or HIPAA compliance. Again, this information may be used to assess an overall cyber risk for the entity.

Again, in some embodiments, direct information about an entity may not be available and an inferential analysis may be required to infer or deduce that gathered information relates to a specific entity. For example, conversations about a possible data breach at a major company may be found on social networks. While the entity might not be specifically named in the conversations, inferential data in the conversations can be used to deduce or infer who the company is. For example, a city where the company is headquartered may be mentioned or employees who are knowledgeable about the data breach might use social media and inadvertently disclose information about the data breach and/or the company's involvement.

In some embodiments, the system 505 can gather non-specific entity information (e.g., information that cannot be directly tied to an entity) and match this non-specific information to entity information in the knowledge base through inferential analysis. The goal in some scenarios is for the system 505 to match this non-specific information to one or more entities in the knowledge base to create a list of possible candidates that match the data included in the non-specific information. In some instance, if the inference score for a specific entity is high enough the system 505 will choose that entity as a match.

In some embodiments, the system 505 employs machine learning on the entity information in this evolving knowledge base to predict actions or statements for an entity. For example, if it is known that an entity has received a round of funding but has been recently criticized for lacking critical infrastructure for servicing its customers, the system 505 can use this information to predict that the entity will be improving their infrastructure. In some embodiments, the system 505 can use this particular information along with other collected entity information to improve a company's other information and processes. While this is a simplified example, the system 505 can use a plurality of data points and inferential analyses to take actions or statements that this company makes and execute a machine learning algorithm to predict an outcome or set of possible outcomes. In some embodiments, the system 505 can execute the machine learning algorithm to also predict actions and statements that the company might make in the future. As an example, the system 505 may learn from past data and use the past data that includes the results of a 50-question survey, and cull the number of questions down to the ten most relevant, important questions. For this example, the system 505 can use machine learning to improve the survey process by preventing redundant questions and focusing the survey on the key questions, improving the value and efficiency of the process. For new entities, for example, the system 505 can leverage existing datasets from other entities to impute values to the new entities. The system 505 may also infer certain attributes for the new entity based on location, size, and other general attributes.

The machine learning algorithms can also be tuned for assisting the system 505 in matching or fitting entity information with specific entities included in the knowledge base. As mentioned above, the predictive nature and accuracy of the machine learning employed by the system 505, in some embodiments, will grow over time as the knowledge base increases. That is, as new information is gathered from public and private resources over time, and as this gathered information is matched to one or more entities, the predictive strength of machine learning of the system 505 improves.

Figure 17:
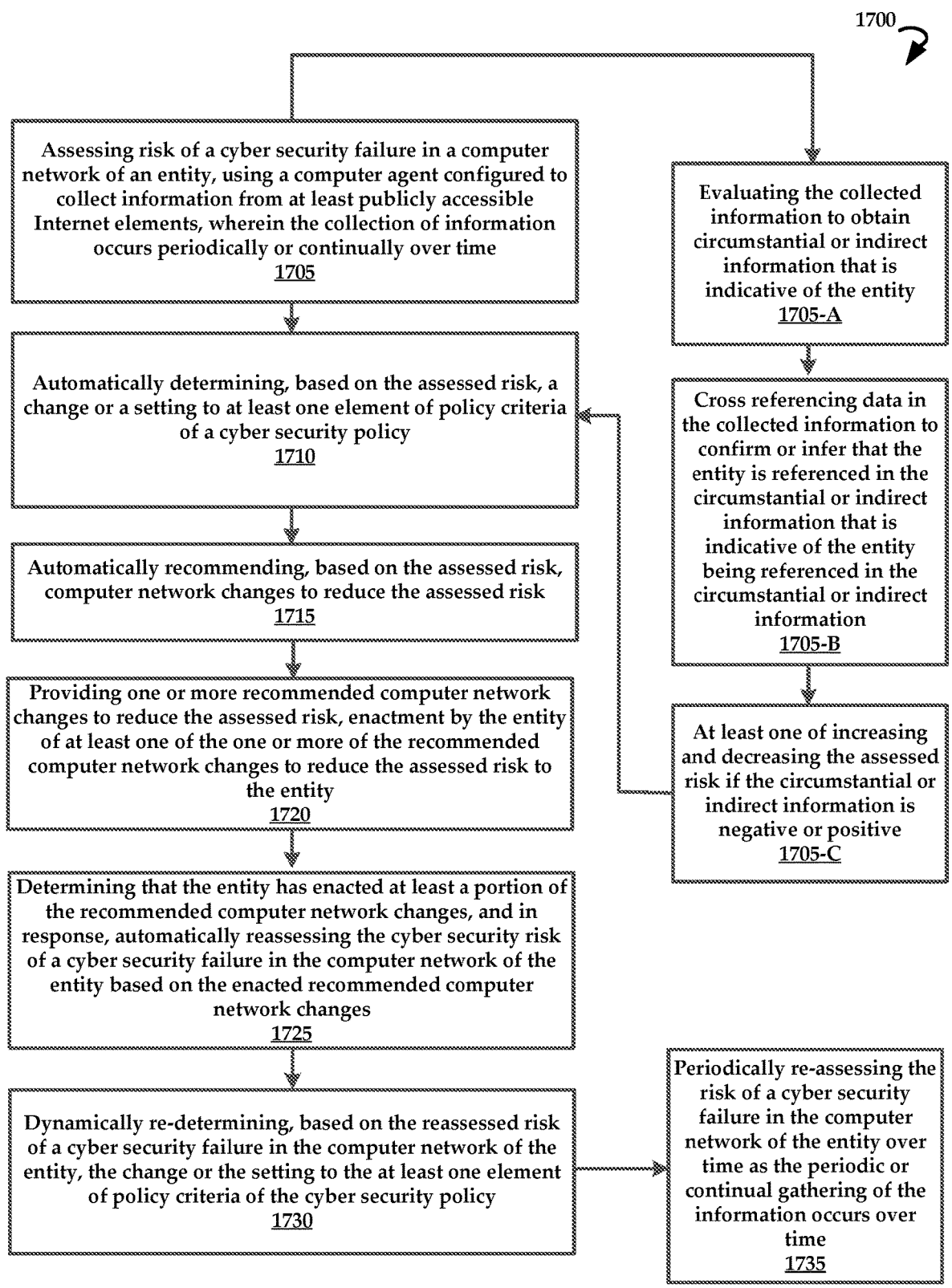
FIG. 17 is a flowchart of an example method of the present disclosure related to improving predictive or inferential analyses (including cyber policy or network changes) using machine learning and continual or periodic data refining.

FIG. 17 is a flowchart of an example method 1700 of the present disclosure. This method is similar to the method of FIG. 16 with the exception that the method includes an evolving feedback loop.

In the example in FIG. 17, the method includes the system 505 assessing 1705 risk of a cyber security failure in a computer network of an entity, using a computer agent configured to collect information from at least publicly accessible Internet elements. The cyber risk includes a security failure (e.g., a cyber-attack, a privacy incident) of the entity.

As mentioned above, the data gathering aspect of the system 505 can allow for continual and periodic collection of data over time. Thus, the system 505, in various embodiments, can evolve by increasing data collection, which strengthens the matching and predictive capabilities of the system 505.

The system 505 may query the entity for information, collect information from available online sources such as websites, corporate filings, news sources, other public record databases, and other resources. Additionally, data may be gathered from the entity's network using devices already present there or by placing a new data collecting device on the entity's network to gather more data. The data collecting device may be on the company's network and/or its periphery, and may collect and/or analyze the data, while also transmitting it to system 505. In this example, additional, proprietary data may be gleaned from a particular entity's network.

In various embodiments, a component of this review process includes a circumstantial or indirect data or information review for the entity. Thus, the example method 1700 includes a sub-process that involves a step 1705-A of evaluating the collected information to obtain circumstantial or indirect information that is indicative of the entity. In one example, the process comprises searching the social media accounts of employees of the entity, as well as any other online resources linked to the employees. Another example includes searching trade journals or legal proceedings. In another example, the process utilizes data gathered during routine use of the system 505 in gathering data for direct cyber risk assessments and extracting circumstantial or indirect information therefrom.

Next, the sub-process, in the example method 1700, comprises a step 1705-B of cross referencing data in the collected information to confirm or infer that the entity is referenced in the circumstantial or indirect information that is indicative of the entity being referenced in the circumstantial or indirect information.

The sub-process can also include a step 1705-C of at least one of increasing or decreasing the assessed risk if the circumstantial or indirect information is negative or positive.

The exemplary method 1700 also includes the system 505 automatically determining, in step 1710, based on the assessed risk, a change or a setting to at least one element of policy criteria of a cyber security policy. In some embodiments, the one or more elements of policy criteria involve a term or condition of a cyber policy. In one embodiment, the cyber policy includes a cyber security insurance policy.

Next, in this example, the method 1700 includes the system 505 automatically recommending, in step 1715, based on the assessed risk, computer network changes to reduce the assessed risk.

Next, in some instances, the method 1700 includes the system 505 providing, in step 1720, one or more recommended computer network changes to reduce the assessed risk, enactment by the entity of at least one of the one or more of the recommended computer network changes to reduce the assessed risk to the entity.

The exemplary method 1700 also includes the system 505 determining, in step 1725, that the entity has enacted at least a portion of the recommended computer network changes, and in response, automatically reassessing the cyber security risk of a cyber security failure in the computer network of the entity based on the enacted recommended computer network changes.

Next, the exemplary method 1700 includes the system 505 dynamically re-determining, in step 1730, based on the reassessed risk, the change or the setting to the at least one element of policy criteria of the cyber security policy.

In some embodiments, the method comprises a step 1735 of periodically re-assessing the risk of a cyber security failure in the computer network of the entity over time as the periodic or continual gathering of the information occurs over time.

As mentioned above and in various embodiments, the re-assessing of the risk results in any of an update to the change or setting to the at least one element of policy criteria of the cyber security policy or an update to the computer network changes.

Thus, the process of period reassessment, in various embodiments, is an evolving feedback loop where information and conclusions about the entity improve over time and additional information is gathered by the system. This evolving information can result in improved cyber security policy changes and/or network changes.

Figure 18:
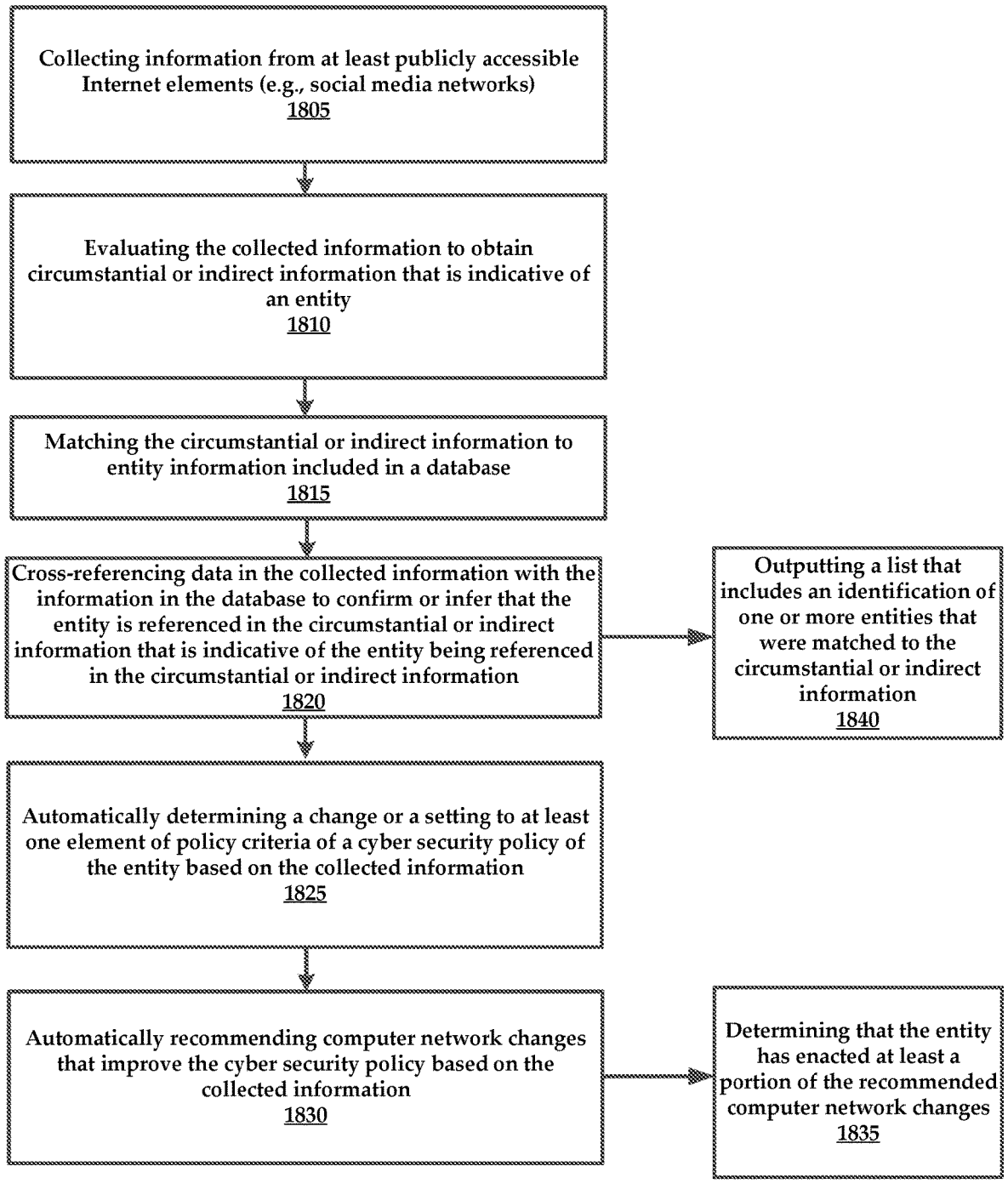
FIG. 18 is a flowchart of an example method of the present disclosure related to predicting or inferring an identity of an entity based on circumstantial or inferential information.

FIG. 18 is a flowchart of another example method 1800. The method generally includes the inference of an entity's identity based on gathered information. These methods are also improved through the evolving data collection processes described above.

In some embodiments, the method includes a step 1805 of collecting information from at least publicly accessible Internet elements. Again, the collection of information occurs periodically or continually over time, according to various embodiments.

Next, the method includes a step 1810 of evaluating the collected information to obtain circumstantial or indirect information that is indicative of an entity. Again, in these embodiments it is understood that direct evidence of the identity of the entity is not available and that the system 505 will attempt to deduce or infer an identity of the entity from circumstantial or indirect information.

Thus, the method can include a step 1815 of matching the circumstantial or indirect information to entity information included in a database, as well as a step 1820 of cross-referencing data in the collected information with the information in the database to confirm or infer that the entity is referenced in the circumstantial or indirect information that is indicative of the entity being referenced in the circumstantial or indirect information.

If a match or partial match is determined, the method includes a step 1840 of outputting a list that includes an identification of one or more entities that were matched to the circumstantial or indirect information.

In some embodiments, the method includes an optional step 1825 of automatically determining a change or a setting to at least one element of policy criteria of a cyber security policy of the entity based on the collected information. Another optional step 1830 includes automatically recommending computer network changes that improve the cyber security policy based on the collected information, as well as a step 1835 of determining that the entity has enacted at least a portion of the recommended computer network changes.

To be sure, the method of the example in FIG. 18 is directed to using circumstantial or indirect information as the basis for confirming an identity of an entity. The confirmation can be based on the circumstantial or indirect information only or by comparison of the circumstantial or indirect information to entity information previously stored in a database.

In some embodiments, the circumstantial or indirect information is obtained from a social network. Again, the social media conversations are obtained from the social networks and analyzed.

Figure 19:
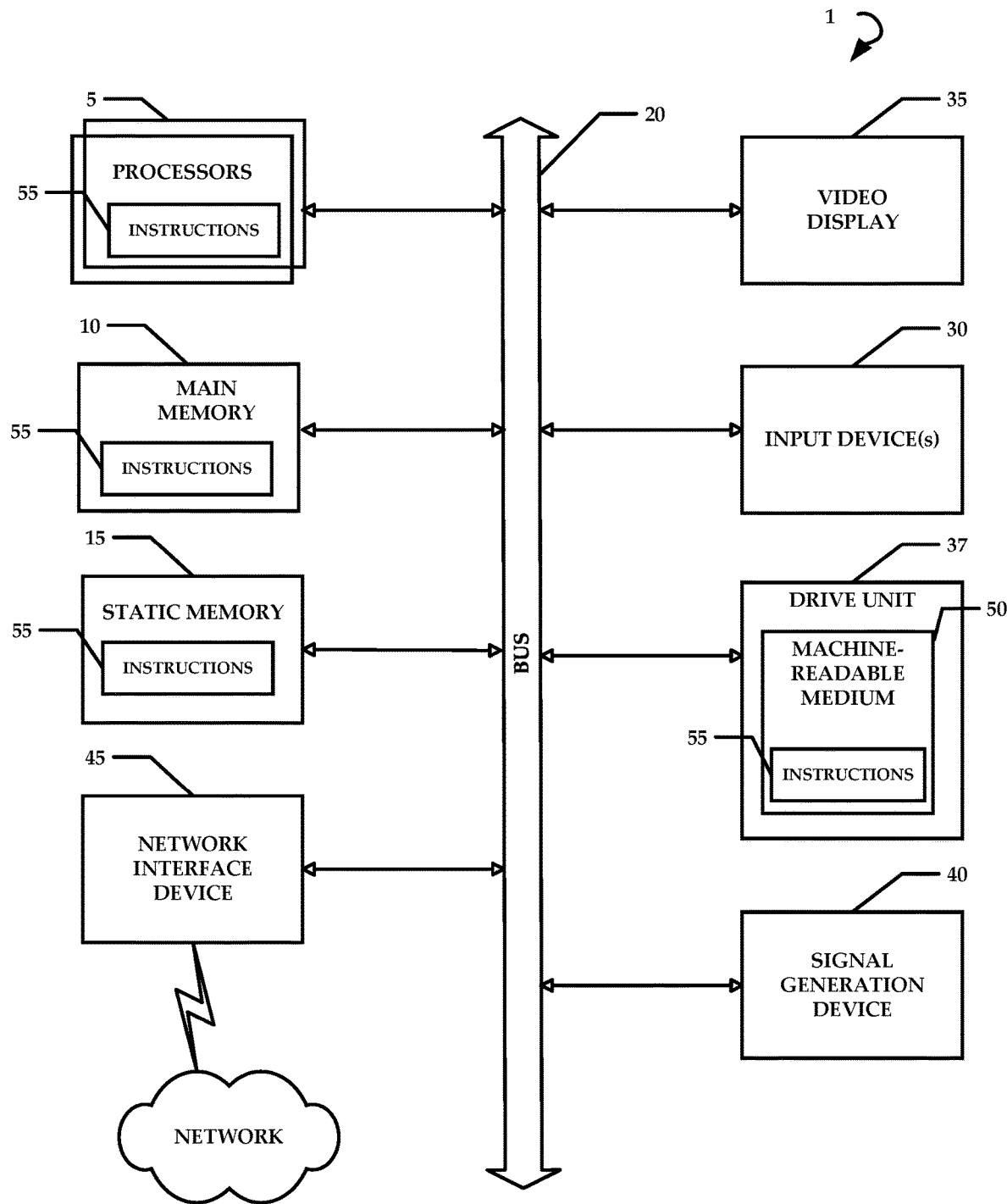
FIG. 19 is a schematic diagram of a computing system that is used to implement embodiments according to the present technology.

FIG. 19 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 105B or network 520, see FIG. 1 and FIG. 5, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
assessing risk of a cyber security failure in a computer network of an entity, using a computer agent configured to collect information from at least one accessible Internet elements, wherein the assessing of the risk comprises:
determining circumstantial or indirect information that is indicative of the entity at least in part by inferring that the collected information relates to the entity based on an inferential analysis; and
determining a certainty level that the circumstantial or indirect information pertains to the entity, wherein an impact of analysis of the circumstantial or indirect information in assessing the risk of the cyber security failure is determined based on the certainty level;
automatically determining, based on the assessed risk, a computer network change to reduce the assessed risk; and
causing a recommendation that is generated based at least in part on the computer network change to be provided over a network to the entity.

2. The method of claim 1, wherein the analysis of the circumstantial or indirect information is weighted based on the certainty level.

3. The method of claim 2, wherein a circumstantial score is generated based on the analysis of the circumstantial or indirect information, and wherein the circumstantial score is weighted based on the certainty level.

4. The method of claim 1, further comprising determining a change in the certainty level.

5. The method of claim 4, wherein the impact of the analysis of the circumstantial or indirect information is changed in response to determining the change in the certainty level.

6. The method of claim 1, further comprising flagging the entity for additional review based on the certainty level.

7. The method of claim 1, wherein the circumstantial or indirect information is ignored based on the certainty level.

8. The method of claim 1, wherein assessing the risk of the cyber security failure comprises assessing risk of a cyber-attack.

9. The method of claim 1, wherein assessing the risk of the cyber security failure comprises assessing risk of a privacy incident.

10. The method of claim 1, wherein the computer agent is configured to periodically collect information over time.

11. A system, comprising:
a memory; and
one or more hardware processors configured to:
assess risk of a cyber security failure in a computer network of an entity, using a computer agent configured to collect information from at least one accessible Internet elements, wherein the assessing of the risk comprises:
determining circumstantial or indirect information that is indicative of the entity at least in part by inferring that the collected information relates to the entity based on an inferential analysis; and
determining a certainty level that the circumstantial or indirect information pertains to the entity, wherein an impact of analysis of the circumstantial or indirect information in assessing the risk of the cyber security failure is determined based on the certainty level;
automatically determine, based on the assessed risk, a computer network change to reduce the assessed risk; and
causing a recommendation that is generated based at least in part on the computer network change to be provided over a network to the entity.

12. The system of claim 11, wherein the analysis of the circumstantial or indirect information is weighted based on the certainty level.

13. The system of claim 12, wherein a circumstantial score is generated based on the analysis of the circumstantial or indirect information, and wherein the circumstantial score is weighted based on the certainty level.

14. The system of claim 11, wherein the one or more hardware processors are further configured to determine a change in the certainty level.

15. The system of claim 14, wherein the impact of the analysis of the circumstantial or indirect information is changed in response to determining the change in the certainty level.

16. The system of claim 11, wherein the one or more hardware processors are further configured to flag the entity for additional review based on the certainty level.

17. The system of claim 11, wherein the circumstantial or indirect information is ignored based on the certainty level.

18. The system of claim 11, wherein assessing the risk of the cyber security failure comprises assessing risk of a cyber-attack.

19. The system of claim 11, wherein assessing the risk of the cyber security failure comprises assessing risk of a privacy incident.

20. The system of claim 11, wherein the computer agent is configured to periodically collect information over time.

* * * * *

UNITED STATES PATENT AND TRADEMARK OFFICE
CERTIFICATE OF CORRECTION

PATENT NO. : 12,355,820 B2
APPLICATION NO. : 18/513085
DATED : July 8, 2025
INVENTOR(S) : George Y. Ng et al.

It is certified that error appears in the above-identified patent and that said Letters Patent is hereby corrected as shown below:

On the Title Page

Page 2, Column 1, item (56), u.s. patent documents, cite no 15, delete "MccCusker" and insert --MCCUSKER--, therefor.

Page 3, Column 2, item (56), other publications, cite no. 1, delete "Intemational" and insert --International--, therefor.

Page 3, Column 2, item (56), other publications, cite no. 2, delete "Intemational" and insert --International--, therefor.

In the Specification

In Column 5, Line(s) 44, delete "(A1N)" and insert --(AlN)--, therefor.

In Column 8, Line(s) 36, delete "polices" and insert --policies--, therefor.

In Column 8, Line(s) 37, delete "polices" and insert --policies--, therefor.

In Column 8, Line(s) 40, delete "entity'" and insert --entity's--, therefor.

In Column 9, Line(s) 27, after "example,", delete "action".

In Column 11, Line(s) 56, delete "decided" and insert --decide--, therefor.

In Column 27, Line(s) 17, delete "determine" and insert --determined--, therefor.

In Column 28, Line(s) 39, after "determining 1625", delete "determining".

Signed and Sealed this
Eighteenth Day of November, 2025

John A. Squires
*Director of the United States Patent and Trademark Office*

In Column 30, Line(s) 35, delete "instance," and insert --instances,--, therefor.

In Column 30, Line(s) 35, delete "instance," and insert --instances,--, therefor.